US011990146B2

(12) United States Patent
Bayer et al.

(10) Patent No.: US 11,990,146 B2
(45) Date of Patent: May 21, 2024

(54) APPARATUS AND AUDIO SIGNAL PROCESSOR, FOR PROVIDING PROCESSED AUDIO SIGNAL REPRESENTATION, AUDIO DECODER, METHODS AND COMPUTER PROGRAMS

(71) Applicant: Fraunhofer-Gesellschaft zur Foerderung der angewandten Forschung e.V., Munich (DE)

(72) Inventors: Stefan Bayer, Erlangen (DE); Pallavi Maben, Erlangen (DE); Emmanuel Ravelli, Erlangen (DE); Guillaume Fuchs, Erlangen (DE); Eleni Fotopoulou, Erlangen (DE); Markus Multrus, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 118 days.

(21) Appl. No.: 17/307,739

(22) Filed: May 4, 2021

(65) Prior Publication Data

US 2021/0256982 A1 Aug. 19, 2021

Related U.S. Application Data

(63) Continuation of application No. PCT/EP2019/080285, filed on Nov. 5, 2019.

(30) Foreign Application Priority Data

Nov. 5, 2018 (EP) .................................... 18204445
May 27, 2019 (WO) ................ PCT/EP2019/063693

(51) Int. Cl.
*G10L 19/022* (2013.01)

(52) U.S. Cl.
CPC .................................. *G10L 19/022* (2013.01)

(58) Field of Classification Search
CPC ...... G10L 19/022; G10L 25/45; G10L 19/008
See application file for complete search history.

(56) References Cited

U.S. PATENT DOCUMENTS 5,394,473 A 2/1995 Davidson
6,594,628 B1 * 7/2003 Jacobs .................... G10L 15/02 704/E15.047

(Continued)

FOREIGN PATENT DOCUMENTS

CA 2871252 A1 1/2010
CA 2778382 A1 4/2011

(Continued)

OTHER PUBLICATIONS

Chen, Juin-Hwey. "Packet loss concealment based on extrapolation of speech waveform." 2009 IEEE International Conference on Acoustics, Speech and Signal Processing. (2009) pp. 4129-4132 (Year: 2009).*

(Continued)

*Primary Examiner* — Jesse S Pullias
*Assistant Examiner* — Michael C. Lee
(74) *Attorney, Agent, or Firm* — Perkins Coie LLP; Michael A. Glenn

(57) ABSTRACT

An apparatus for providing a processed audio signal representation on the basis of input audio signal representation configured to apply an un-windowing, in order to provide the processed audio signal representation on the basis of the input audio signal representation. The apparatus is configured to adapt the un-windowing in dependence on one or more signal characteristics and/or in dependence on one or more processing parameters used for a provision of the input audio signal representation.

42 Claims, 13 Drawing Sheets

(56) References Cited

U.S. PATENT DOCUMENTS

| | | | |
|---|---|---|---|
| 8,615,390 B2 | 12/2013 | Kovesi et al. | |
| 10,380,989 B1* | 8/2019 | Chen | G10L 25/18 |
| 2003/0058964 A1 | 3/2003 | Ezquerra-moreu et al. | |
| 2008/0019538 A1 | 1/2008 | Kushner et al. | |
| 2008/0056511 A1* | 3/2008 | Zhang | G10L 19/005 381/94.4 |
| 2008/0165871 A1* | 7/2008 | Kisoda | H04L 25/0232 375/260 |
| 2010/0246508 A1 | 9/2010 | Chang et al. | |
| 2011/0019761 A1 | 1/2011 | Shimada et al. | |
| 2011/0087494 A1 | 4/2011 | Kim et al. | |
| 2011/0274280 A1 | 11/2011 | Brown | |
| 2012/0022880 A1 | 1/2012 | Bessette | |
| 2012/0158409 A1* | 6/2012 | Nagel | G10L 19/24 704/500 |
| 2012/0271644 A1 | 10/2012 | Bessette et al. | |
| 2013/0096913 A1* | 4/2013 | Bruhn | G10L 19/06 704/219 |
| 2013/0124215 A1 | 5/2013 | Lecomte et al. | |
| 2014/0046670 A1 | 2/2014 | Moon et al. | |
| 2016/0050420 A1* | 2/2016 | Helmrich | G10L 19/022 375/240.24 |
| 2016/0191005 A1 | 6/2016 | Burgio | |
| 2017/0103761 A1* | 4/2017 | Sun | G10L 19/028 |
| 2017/0270936 A1* | 9/2017 | Chebiyyam | H04S 3/008 |
| 2017/0345433 A1* | 11/2017 | Dittmar | G10L 13/04 |
| 2017/0365264 A1 | 12/2017 | Disch et al. | |
| 2017/0365267 A1 | 12/2017 | Edler et al. | |
| 2018/0226080 A1 | 8/2018 | Chebiyyam et al. | |
| 2019/0156841 A1* | 5/2019 | Fatus | G10L 19/008 |
| 2019/0373397 A1 | 12/2019 | Yen et al. | |
| 2023/0123620 A1 | 4/2023 | Simpson | |

FOREIGN PATENT DOCUMENTS

| | | | |
|---|---|---|---|
| CN | 101076850 | A | 11/2007 |
| CN | 101331540 | A | 12/2008 |
| CN | 102017560 | A | 4/2011 |
| CN | 102884574 | A | 1/2013 |
| CN | 104718572 | A | 6/2015 |
| CN | 107835483 | A | 3/2018 |
| EP | 1335349 | A2 | 8/2003 |
| EP | 2214164 | A2 | 8/2010 |
| GB | 0914802 | | 9/2009 |
| GB | 2472992 | A | 3/2011 |
| JP | 2013532310 | A | 8/2013 |
| JP | 2014029407 | A | 2/2014 |
| WO | 2006039994 | A2 | 4/2006 |
| WO | 2009109120 | A1 | 9/2009 |
| WO | 2009131066 | A1 | 10/2009 |
| WO | 2013061584 | A1 | 5/2013 |
| WO | 2017161315 | A1 | 9/2017 |

OTHER PUBLICATIONS

Zhang, Chunling, et al. "An improved method for AMR-WB speech codec." 2012 2nd International Conference on Computer and Information Application (ICCIA 2012), pp. 490-493 (Year: 2012).*

Bäckström, Tom. "Comparison of windowing in speech and audio coding." 2013 IEEE Workshop on Applications of Signal Processing to Audio and Acoustics. (2013), pp. 1-4 (Year: 2013).*

Lecomte, Jérémie, et al. "Packet-loss concealment technology advances in EVS." 2015 IEEE International Conference on Acoustics, Speech and Signal Processing (ICASSP). (2015) at pp. 5708-5712 (Year: 2015).*

Definition of "Reverse" at m-w.com, available at https://web.archive.org/web/20171225183335/https://www.merriam-webster.com/dictionary/reverse, archived on Dec. 25, 2017. (Year: 2017).*

Time-Varying Transform for High Quality Audio Communication CodecsPresented at the 124th Convention of Audio Engineering Society Convention Paper 7333. May 17-20, 2008 Amsterdam, The Neterhlands.

"Uploaded in 3 parts_EVS Codec Detailed algorithmic description", (3GPP TS 26.445 version 13.4.1 Release 13); ETSI TS 126 445 V13.4.1. (Apr. 2017), Apr. 2017, 661 pp.

Philippe, Pierrick, et al., "Time-Varying Transform for High Quality Audio Communication Codecs", AES Convention 124; May 2008, AES, 60 East 42nd Street, Room 2520 New York 10165-2520, USA, May 17, 2008.

"" Definition of "Bartlett" in MathWorks Matlab Documentation, available at https://web.archive.org/web/20171029034758/https://www.mathworks.com/help/signal/ref/bartlett.html (Archived on Oct. 29, 2017) (Year: 2017).

* cited by examiner

APPARATUS AND AUDIO SIGNAL PROCESSOR, FOR PROVIDING PROCESSED AUDIO SIGNAL REPRESENTATION, AUDIO DECODER, METHODS AND COMPUTER PROGRAMS

CROSS-REFERENCES TO RELATED APPLICATIONS

This application is a continuation of copending International Application No. PCT/EP2019/080285, filed Nov. 5, 2019, which is incorporated herein by reference in its entirety, and additionally claims priority from European Application No. 18204445.3, filed Nov. 5, 2018 and International Application No. PCT/EP2019/063693, filed May 27, 2019, all of which are incorporated herein by reference in their entirety.

Embodiments according to the invention related to an apparatus and an audio signal processor, for providing a processed audio signal representation, an audio decoder, an audio encoder, methods and computer programs.

INTRODUCTORY REMARKS

In the following, different inventive embodiments and aspects will be described. Also, further embodiments will be defined by the enclosed claims.

It should be noted that any embodiments as defined by the claims can be supplemented by any of the details (features and functionalities) described in the mentioned embodiments and aspects.

Also, the embodiments described herein can be used individually, and can also be supplemented by any feature included in the claims.

Also, it should be noted that individual aspects described herein can be used individually or in combination. Thus, details can be added to each of said individual aspects without adding details to another one of said aspects.

It should also be noted that the present disclosure describes, explicitly or implicitly, features usable in an audio encoder (apparatus and/or audio signal processor for providing a processed audio signal representation) and in an audio decoder. Thus, any of the features described herein can be used in the context of an audio encoder and in the context of an audio decoder.

Moreover, features and functionalities disclosed herein relating to a method can also be used in an apparatus (configured to perform such functionality). Furthermore, any features and functionalities disclosed herein with respect to an apparatus can also be used in a corresponding method. In other words, the methods disclosed herein can be supplemented by any of the features and functionalities described with respect to the apparatuses.

Also, any of the features and functionalities described herein can be implemented in hardware or in software, or using a combination of hardware and software, as will be described in the section “implementation alternatives”.

BACKGROUND OF THE INVENTION

Processing discrete time signals using the Discrete Fourier Transform (DFT) is a widespread approach to digital signal processing, first for possible complexity savings due to efficient implementations of the DFT or of the Fast Fourier Transforms FFT and second for the representation of the signal in the frequency domain after the DFT which allows for easier frequency dependent processing of the time signal. If the processed signal is transformed back to the time domain typically to avoid the consequences of the circular convolution property of the DFT, overlapping parts of the time signal are transformed and to ensure a good reconstruction after processing the individual time segments (frames) are windowed before and/or after the forward DFT/processing/inverse DFT chain and the overlapping parts added up to form the processed time signal. This approach is, for example, shown in FIG. 6.

Common low-delay systems use un-windowing to generate an approximation of a processed discrete time signal without availability of a following frame for overlap add by simply un-windowing by dividing the right windowed portion of a frame processed with a DFT filter bank by the window applied before the forward DFT in the processing chain, e.g. WO 2017/161315 A1. In FIG. 7 an example for a windowed frame of a time domain signal before the forward DFT and the corresponding applied window shape is shown.

$$y_r[n] = y,\ n < n_s$$

$$y_r[n] = \frac{y[n]}{w_a[n]},\ n \in [n_s; n_e],$$

where $n_s$ is the index of the first sample of the overlapping region with the following frame not yet available and $n_e$ is the index of the last sample of the overlapping region with the following frame and $w_a$ is the window applied to the current frame of the signal before the forward DFT.

Depending on the processing and the used window, the envelope of the analysis window shape is not guaranteed to be preserved and especially towards the end of the window the window samples have values close to zero and therefore the processed samples are multiplied with values >>1 which can lead to large deviations in the last samples of the un-windowed signals in comparison to the signal produced by OLA (Overlap-Add) with a following frame. In FIG. 8 an example for a mismatch between approximation with static un-windowing and OLA with a following frame after processing in the DFT domain and the inverse DFT is shown.

These deviations might lead to degradations compared to an OLA with the following frame if the un-windowed signal approximation is used in a further processing step, e.g. when using the approximated signal portion in a LPC analysis. In FIG. 9 an example of a LPC analysis done on the approximated signal portion of the previous example is shown.

Therefore, it is desired to get a concept which provides an improved compromise between signal integrity, complexity and delay which is usable when reconstructing a time domain signal representation on the basis of a frequency domain representation without performing an overlap-add.

This is achieved by the subject matter of the independent claims of the present application.

SUMMARY

An embodiment may have an apparatus for providing a processed audio signal representation on the basis of input audio signal representation, wherein the apparatus is configured to apply an un-windowing, in order to provide the processed audio signal representation on the basis of the input audio signal representation, wherein the apparatus is configured to adapt the un-windowing in dependence on one or more signal characteristics and/or in dependence on one or more processing parameters used for a provision of the input audio signal representation; and wherein the un-windowing at least partially reverses an analysis windowing used for a provision of the input audio signal representation; and wherein the un-windowing is configured to provide a given processing unit of the processed audio signal representation before a subsequent processing unit, which at least partially temporally overlaps the given processing unit, is available.

Another embodiment may have an audio signal processor for providing a processed audio signal representation on the basis of an audio signal to be processed, wherein the audio signal processor is configured to apply an analysis windowing to a time domain representation of a processing unit of an audio signal to be processed, to acquire a windowed version of the time domain representation of the processing unit of the audio signal to be processed, and wherein the audio signal processor is configured to acquire a spectral domain representation of the audio signal to be processed on the basis of the windowed version, wherein the audio signal processor is configured to apply a spectral domain processing to the acquired spectral domain representation, to acquire a processed spectral domain representation, wherein the audio signal processor is configured to acquire a processed time domain representation on the basis of the processed spectral domain representation, and wherein the audio signal processor includes an above first inventive apparatus for providing a processed audio signal representation on the basis of input audio signal representation, wherein the apparatus is configured to acquire the processed time domain representation as its input audio signal representation, and to provide, on the basis thereof, the processed audio signal representation.

Another embodiment may have an audio decoder for providing a decoded audio representation on the basis of an encoded audio representation, wherein the audio decoder is configured to acquire a spectral domain representation of an encoded audio signal on the basis of the encoded audio representation, wherein the audio decoder is configured to acquire a time domain representation of the encoded audio signal on the basis of the spectral domain representation, and wherein the audio decoder includes an above first inventive apparatus for providing a processed audio signal representation on the basis of input audio signal representation, wherein the apparatus is configured to acquire the time domain representation as its input audio signal representation, and to provide, on the basis thereof, the processed audio signal representation.

Another embodiment may have an audio encoder for providing an encoded audio representation on the basis of an input audio signal representation, wherein the audio encoder includes an above first inventive apparatus for providing a processed audio signal representation on the basis of input audio signal representation, wherein the apparatus is configured to acquire a processed audio signal representation on the basis of the input audio signal representation, and wherein the audio encoder is configured to encode the processed audio signal representation.

Another embodiment may have an apparatus for providing a processed audio signal representation on the basis of input audio signal representation, wherein the apparatus is configured to apply an un-windowing, in order to provide the processed audio signal representation on the basis of the input audio signal representation, wherein the apparatus is configured to adapt the un-windowing in dependence on one or more signal characteristics and/or in dependence on one or more processing parameters used for a provision of the input audio signal representation; and wherein the un-windowing at least partially reverses an analysis windowing used for a provision of the input audio signal representation; and wherein the apparatus is configured to adapt the un-windowing, to thereby limit a dynamic range of the processed audio signal representation.

Another embodiment may have a method for providing a processed audio signal representation on the basis of an input audio signal representation, wherein the method includes applying an un-windowing, in order to provide the processed audio signal representation on the basis of the input audio signal representation, wherein the method includes adapting the un-windowing in dependence on one or more signal characteristics and/or in dependence on one or more processing parameters used for a provision of the input audio signal representation, wherein the un-windowing at least partially reverses an analysis windowing used for a provision of the input audio signal representation; and wherein the un-windowing provides a given processing unit of the processed audio signal representation before a subsequent processing unit, which at least partially temporally overlaps the given processing unit, is available.

Still another embodiment may have a method for providing a processed audio signal representation on the basis of an audio signal to be processed, wherein the method includes applying an analysis windowing to a time domain representation of a processing unit of an audio signal to be processed, to acquire a windowed version of the time domain representation of the processing unit of the audio signal to be processed, and wherein the method includes acquiring a spectral domain representation of the audio signal to be processed on the basis of the windowed version, wherein the method includes applying a spectral domain processing to the acquired spectral domain representation, to acquire a processed spectral domain representation, wherein the method includes acquiring a processed time domain representation on the basis of the processed spectral domain representation, and wherein the method includes providing the processed audio signal representation using the above first inventive method for providing a processed audio signal representation on the basis of an input audio signal representation wherein the processed time domain representation is used as the input audio signal for performing the above first inventive method for providing a processed audio signal representation on the basis of an input audio signal representation.

Another embodiment may have a method for providing a decoded audio representation on the basis of an encoded audio representation, wherein the method includes acquiring a spectral domain representation of an encoded audio signal on the basis of the encoded audio representation, wherein the method includes acquiring a time domain representation of the encoded audio signal on the basis of the spectral domain representation, and wherein the method includes providing the processed audio signal representation using the above first inventive method for providing a processed audio signal representation on the basis of an input audio signal representation, wherein the time domain representation is used as the input audio signal for performing above first inventive method for providing a processed audio signal representation on the basis of an input audio signal representation.

Another embodiment may have a method for providing an encoded audio representation on the basis of an input audio signal representation, wherein the method includes acquiring a processed audio signal representation on the basis of the input audio signal representation using the above first inventive method for providing a processed audio signal representation on the basis of an input audio signal representation, and wherein the method includes encoding the processed audio signal representation.

Another embodiment may have a method for providing a processed audio signal representation on the basis of an input audio signal representation, wherein the method includes applying an un-windowing, in order to provide the processed audio signal representation on the basis of the input audio signal representation, wherein the method includes adapting the un-windowing in dependence on one or more signal characteristics and/or in dependence on one or more processing parameters used for a provision of the input audio signal representation, wherein the adapting of the un-windowing is performed such that a large amplification caused by the un-windowing without an adaptation is reduced, to thereby limit a dynamic range of the processed audio signal representation, and wherein the un-windowing at least partially reverses an analysis windowing used for a provision of the input audio signal representation.

Another embodiment may have an apparatus for providing a processed audio signal representation on the basis of input audio signal representation, wherein the apparatus is configured to apply an un-windowing, in order to provide the processed audio signal representation on the basis of the input audio signal representation, wherein the apparatus is configured to adapt the un-windowing in dependence on one or more signal characteristics and/or in dependence on one or more processing parameters used for a provision of the input audio signal representation; and wherein the apparatus is configured to adapt the un-windowing such that for an input audio signal representation which does not converge to zero in an end portion of a processing unit of the input audio signal, a scaling which is applied by the un-windowing in the end portion of the processing unit is reduced when compared to a case in which the input audio signal representation converges to zero in the end portion of the processing unit, and wherein the un-windowing at least partially reverses an analysis windowing used for a provision of the input audio signal representation.

Still another embodiment may have an audio encoder for providing an encoded audio representation on the basis of an input audio signal representation, wherein the audio encoder includes an apparatus for providing a processed audio signal representation on the basis of the input audio signal representation, wherein the audio encoder is configured to encode the processed audio signal representation, wherein the apparatus is configured to apply an un-windowing, in order to provide the processed audio signal representation on the basis of the input audio signal representation, wherein the apparatus is configured to adapt the un-windowing in dependence on one or more signal characteristics and/or in dependence on one or more processing parameters used for a provision of the input audio signal representation, and wherein the un-windowing at least partially reverses an analysis windowing used for a provision of the input audio signal representation.

Another embodiment may have an audio decoder for providing a decoded audio representation on the basis of an encoded audio representation, wherein the audio decoder is configured to acquire a spectral domain representation of an encoded audio signal on the basis of the encoded audio representation, wherein the audio decoder is configured to acquire a time domain representation of the encoded audio signal on the basis of the spectral domain representation, and wherein the audio decoder includes an apparatus, wherein the apparatus is configured to acquire the time domain representation as its input audio signal representation, and to provide, on the basis thereof, a processed audio signal representation, wherein the apparatus is configured to apply an un-windowing, in order to provide the processed audio signal representation on the basis of the input audio signal representation, wherein the apparatus is configured to adapt the un-windowing in dependence on one or more signal characteristics and/or in dependence on one or more processing parameters used for a provision of the input audio signal representation, wherein the un-windowing at least partially reverses an analysis windowing used for a provision of the input audio signal representation, wherein the audio decoder is configured to provide the audio signal representation of a given processing unit before a subsequent processing unit which temporally overlaps with the given processing unit is decoded.

Another embodiment may have a method for providing a processed audio signal representation on the basis of input audio signal representation, wherein the method includes applying an un-windowing, in order to provide the processed audio signal representation on the basis of the input audio signal representation, wherein the method includes adapting the un-windowing in dependence on one or more signal characteristics and/or in dependence on one or more processing parameters used for a provision of the input audio signal representation, wherein the adapting of the un-windowing is performed such that for an input audio signal representation which does not converge to zero in an end portion of a processing unit of the input audio signal, a scaling which is applied by the un-windowing in the end portion of the processing unit is reduced when compared to a case in which the input audio signal representation converges to zero in the end portion of the processing unit, and wherein the un-windowing at least partially reverses an analysis windowing used for a provision of the input audio signal representation.

Another embodiment may have a method for providing an encoded audio representation on the basis of an input audio signal representation, wherein the method includes acquiring a processed audio signal representation on the basis of the input audio signal representation using a method for providing a processed audio signal representation on the basis of input audio signal representation including, applying an un-windowing, in order to provide the processed audio signal representation on the basis of the input audio signal representation, and adapting the un-windowing in dependence on one or more signal characteristics and/or in dependence on one or more processing parameters used for a provision of the input audio signal representation, and wherein the un-windowing at least partially reverses an analysis windowing used for a provision of the input audio signal representation, wherein the method for providing the encoded audio representation includes encoding the processed audio signal representation.

Still another embodiment may have a method for providing a decoded audio representation on the basis of an encoded audio representation, wherein the method includes acquiring a spectral domain representation of an encoded audio signal on the basis of the encoded audio representation, wherein the method includes acquiring a time domain representation of the encoded audio signal on the basis of the spectral domain representation, and wherein the method includes providing the processed audio signal representation using a method for providing a processed audio signal representation on the basis of input audio signal representation, wherein the time domain representation is used as the input audio signal, including applying an un-windowing, in order to provide the processed audio signal representation on the basis of the input audio signal representation, and adapting the un-windowing in dependence on one or more signal characteristics and/or in dependence on one or more processing parameters used for a provision of the input audio signal representation, wherein the un-windowing at least partially reverses an analysis windowing used for a provision of the input audio signal representation, wherein the method includes providing the audio signal representation of a given processing unit before a subsequent processing unit which temporally overlaps with the given processing unit is decoded.

Another embodiment may have a non-transitory digital storage medium having a computer program stored thereon to perform the above inventive methods when said computer program is run by a computer.

An embodiment according to this invention is related to an apparatus for providing a processed audio signal representation on the basis of input audio signal representation. The apparatus is configured to apply an un-windowing, for example an adaptive un-windowing, in order to provide the processed audio signal representation on the basis of the input audio signal representation. The un-windowing, for example, at least partially reverses an analysis windowing used for a provision of the input audio signal representation. Furthermore, the apparatus is configured to adapt the un-windowing in dependence on one or more signal characteristics and/or in dependence on one or more processing parameters used for the provision of the input audio signal representation. According to an embodiment, the provision of the input audio signal representation can, for example, be performed by a different device or processing unit. The one or more signal characteristics are, for example, characteristics of the input audio signal representation or of an intermediate representation from which the input audio signal representation is derived. According to an embodiment, the one or more signal characteristics comprise, for example, a DC component d. The one or more processing parameters can, for example, comprise parameters used for an analysis windowing, a forward frequency transform, a processing in the frequency domain and/or an inverse time frequency transform of the input audio signal representation or of an intermediate representation from which the input audio signal representation is derived.

This embodiment is based on the idea that a very precise processed audio signal representation can be achieved by adapting the un-windowing in dependence on signal characteristics and/or processing parameters used for a provision of the input audio signal representation. With the dependency on signal characteristics and processing parameters, it is possible to adapt the un-windowing according to individual processing used for the provision of the input audio signal representation. Furthermore, with the adaptation of the un-windowing, the provided processed audio signal representation can represent an improved approximation of a real processed and overlap-added signal, on the basis of the input audio signal representation, for example, at least in an area of a right overlap part, i.e. in an end portion of the provided processed audio signal representation, when no following frame is available yet. For example, using this concept, it is possible to adapt the un-windowing to thereby reduce an undesired degradation of a signal envelope in a time region where the un-windowing causes a strong upscaling (e.g. by a factor larger than 5 or larger than 10).

According to an embodiment, the apparatus is configured to adapt the un-windowing in dependence on processing parameters determining a processing used to derive the input audio signal representation. The processing parameters determine, for example, a processing of a current processing unit or frame, and/or a processing of one or more previous processing units or frames. According to an embodiment, the processing determined by the processing parameters comprises an analysis windowing, a forward frequency transform, a processing in a frequency domain and/or an inverse time frequency transform of the input audio signal representation or of an intermediate representation from which the input audio signal representation is derived. This list of processing methods used for a provision of the input audio signal is not exhaustive and it is clear, that more or different processing methods can be used. The invention is not limited to the herein proposed list of processing methods. This influence of the processing in the un-windowing can result in an improved accuracy of the provided processed audio signal representation.

According to an embodiment, the apparatus is configured to adapt the un-windowing in dependence on signal characteristics of the input audio signal representation and/or of an intermediate signal representation from which the input audio signal representation is derived. The signal characteristics can be represented by parameters. The input audio signal representation is, for example, a time domain signal of a current processing unit or frame, for example, after a processing in a frequency domain and a frequency-domain to time-domain conversion. The intermediate signal representation is, for example, a processed frequency domain representation from which the input audio signal representation is derived using a frequency-domain to time-domain conversion. The frequency-domain to time-domain conversion can optionally be performed in this embodiment and/or in one of the following embodiments using an aliasing cancellation or not using an aliasing cancellation (e.g., using an inverse transform which is a lapped transform that may comprise aliasing cancelation characteristics by performing an overlap-and-add, like, for example, an MDCT transform).

According to an embodiment, the difference between processing parameters and signal characteristics is that processing parameters, for example, determine a processing, like an analysis windowing, a forward frequency transform, a processing in a spectral domain, inverse time frequency transform, etc., and signal characteristics, for example, determine a representation of a signal, like an offset, an amplitude, a phase, etc. The signal characteristics of the input audio signal representation and/or of the intermediate signal representation can result in an adaptation of the un-windowing in such a way that no overlap-add with a following frame may be used to provide the processed audio signal representation. According to an embodiment, the apparatus is configured to apply the un-windowing to the input audio signal representation to provide the processed audio signal representation, wherein it is, for example, advantageous to adapt the un-windowing in dependence on signal characteristics of the input audio signal representation, to reduce a deviation between the provided processed audio signal representation and an audio signal representation which would be obtained using an overlap-add with a following frame. Additionally or alternatively, a consideration of signal characteristics of the intermediate signal representation can further improve the un-windowing, such that, for example, the deviation is significantly reduced. For example, signal characteristics may be considered which indicate potential problems of a conventional un-windowing, like, for example, signal characteristics indicating a DC-offset or a slow or insufficient convergence to zero at an end of a processing unit.

According to an embodiment, the apparatus is configured to obtain one or more parameters describing signal characteristics of a time domain representation of a signal, to which the un-windowing is applied. The time domain representation represents, for example, an original signal from which the input audio signal representation is derived or an intermediate signal, after a frequency-domain to time-domain conversion, which represents the input audio signal representation or from which the input audio signal representation is derived. The signal, to which the un-windowing is applied is, for example, the input audio signal representation or a time domain signal of a current processing unit or frame, for example, after a processing in a frequency domain and a frequency-domain to time-domain conversion. According to an embodiment, the one or more parameters describe signal characteristics of, for example, the input audio signal representation or a time domain signal of a current processing unit or frame, for example, after a processing in a frequency domain and a frequency-domain to time-domain conversion. Additionally or alternatively the apparatus is configured to obtain one or more parameters describing signal characteristics of a frequency domain representation of an intermediate signal from which a time domain input audio signal, to which the un-windowing is applied, is derived. The time domain input audio signal represents, for example, the input audio signal representation. The apparatus can be configured to adapt the un-windowing in dependence on the one or more parameters described above. The intermediate signal is, for example, a signal to be processed to determine the above-described signal and the input audio signal representation. The time domain representation and the frequency domain representation represent, for example, the input audio signal representation at important processing steps, which can positively influence the un-windowing to minimize defects (or artifacts) in the processed audio signal representation based on an abandonment of an overlap-add processing to provide the processed audio signal representation. For example, the parameters describing signal characteristics may indicate when an application of an original (non-adapted) un-windowing would result (or is likely to result) in artifacts. Thus, the adaptation of the un-windowing (for example, to derivate from a conventional un-windowing) can be controlled efficiently on the basis of said parameters.

According to an embodiment, the apparatus is configured to adapt the un-windowing to at least partially reverse an analysis windowing used for a provision of the input audio signal representation. The analysis windowing is, for example, applied to a first signal to get an intermediate signal which, for example, is further processed for a provision of the input audio signal representation. Thus, the processed audio signal representation provided by the apparatus by applying the adapted un-windowing represents at least partially the first signal in a processed form. Thus, a very accurate and improved low delay processing of the first signal can be realized by the adaptation of the un-windowing.

According to an embodiment, the apparatus is configured to adapt the un-windowing to at least partially compensate for a lack of signal values of a subsequent processing unit, for example, a subsequent frame or following frame. Thus, there is no need for an overlap-add with a following frame to obtain a time signal, for example, the processed audio signal representation, that is a good approximation of the fully processed signal which would be obtainable using an overlap-add with a following frame. This leads to a lower delay for a signal processing system where a time signal is further processed after a processing using a filter bank, since the overlap-add can be omitted. Thus, with this feature, it is not necessary to already process the subsequent processing unit for providing the processed audio signal representation.

According to an embodiment, the un-windowing is configured to provide a given processing unit, for example, a time segment, a frame or a current time segment, of the processed audio signal representation before a subsequent processing unit, which at least partially temporally overlaps the given processing unit, is available. The processed audio signal representation can comprise a plurality of previous processing units, e.g. chronologically before the given processing unit, e.g. a currently processed time segment, and a plurality of subsequent processing units, e.g. chronologically after the given processing unit and the input audio signal representation, on which the provision of the processed audio signal representation is based, represents, for example, a time signal with a plurality of time segments. Alternatively the processed audio signal representation represents a processed time signal in the given processing unit and the input audio signal representation, on which the provision of the processed audio signal representation is based, represents, for example, a time signal in the given processing unit. To receive a processed time signal in the given processing unit, for example, a windowing is applied to the input audio signal representation or to a first time signal to be processed for a provision of the input audio signal representation, then a processing can be applied to the signal, e.g., an intermediate signal, of the current time segment, or the given processing unit, and after the processing, the un-windowing is applied, wherein, for example, an overlapping segment of the given processing unit with a previous processing unit is summed by an overlap-add but no overlapping segment of the given processing unit with a subsequent processing unit is summed by an overlap-add. The given processing unit can comprise overlapping segments with a previous processing unit and the subsequent processing unit. Thus, the un-windowing is, for example, adapted such that the temporally overlapping segments of the given processing unit with the subsequent processing unit can be approximated by the un-windowing very accurately (without performing an overlap-add). Thus, the audio signal representation can be processed with reduced delay because only the given processing unit and a previous processing unit are, for example, considered, without including the subsequent processing unit.

According to an embodiment, the apparatus is configured to adapt the un-windowing to limit a deviation between the given processed audio signal representation and a result of an overlap-add between subsequent processing units of the input audio signal representation or, for example, of a processed input audio signal representation. Here, especially a deviation between the given processed audio signal representation and a result of an overlap-and-add between a given processing unit, a previous processing unit and a subsequent processing unit of the input audio signal representation is, for example, limited by the un-windowing. The previous processing unit is, for example, already known by the apparatus, whereby the un-windowing of the given processing unit can be adapted to, for example, approximate a temporally overlapping time segment of the given processing unit with a subsequent processing unit (without actually performing an overlap-add), to limit the deviation. With this adaptation of the un-windowing, a very small deviation is, for example, achieved, whereby the apparatus is very accurate in providing the processed audio signal representation without a processing (and overlap-adding) of a subsequent processing unit.

According to an embodiment, the apparatus is configured to adapt the un-windowing to limit values of the processed audio signal representation. The un-windowing is, for example, adapted such, that the values are, for example, limited at least in an end portion of a processing unit, e.g., of a given processing unit, of the input audio signal representation. The apparatus is, for example, configured to use weighing values for performing an unweighing (or un-windowing) which are smaller than multiplicative inverses for corresponding values of an analysis windowing used for a provision of the input audio signal representation, for example, at least for a scaling of an end portion of a processing unit of the input audio signal representation. If, for example, the end portion of the processing unit of the input audio signal representation does not tend (or converge) enough to zero, an un-windowing without an adaptation with a limiting of the values can result in a too much amplification of the values of the end portion of the processed audio signal representation. The limitation of the values (e.g., by using "reduced" weighting values) can result in a very accurate provision of the processed audio signal representation because large deviations caused by amplification, caused by an inappropriate un-windowing, can be avoided.

According to an embodiment, the apparatus is configured to adapt the un-windowing such that for an input audio signal representation which does not, e.g. smoothly, converge to zero in an end portion of a processing unit of the input audio signal, a scaling which is applied by the un-windowing in the end portion of the processing unit is reduced when compared to a case in which the input audio signal representation, e.g. smoothly, converge to zero in the end portion of the processing unit. With the scaling, for example, values in the end portion of the processing unit of the input audio signal are amplified. To avoid a too large amplification of the values in the end portion of the processing unit of the input audio signal, the scaling applied by the un-windowing in the end portion of the processing unit is reduced when the input audio signal representation does not converge to zero.

According to an embodiment, the apparatus is configured to adapt the un-windowing, to thereby limit a dynamic range of the processed audio signal representation. The un-windowing is, for example, adapted such that the dynamic range is limited at least in an end portion of a processing unit of the input audio signal representation, or selectively in the end portion of the processing unit of the input audio signal representation, whereby also the dynamic range of the processed audio signal representation is limited. The un-windowing is, for example, adapted such that a large amplification caused by the un-windowing without an adaptation, is reduced to limit the dynamic range of the processed audio signal representation. Thus, a very small or nearly no deviation between the given processed audio signal representation and a result of an overlap-add between subsequent processing units of the input audio signal representation can be achieved, wherein the input audio signal representation represents, for example, a time-domain signal after a processing in a spectral domain and a spectral-domain to time-domain conversion.

According to an embodiment, the apparatus is configured to adapt the un-windowing in dependence of a DC component, e.g. an offset, of the input audio signal representation. According to an embodiment, a processing of a first signal or an intermediate signal representation to provide the input audio signal representation can add the DC offset d to a processed frame of the first signal or the intermediate signal, wherein the processed frame represents, for example, the input audio signal representation. With this DC component, the input audio signal representation does, for example, not converge enough to zero, whereby an error in the un-windowing can occur. With the adaptation of the un-windowing in dependence on the DC component, this error can be minimized.

According to an embodiment, the apparatus is configured to at least partially remove a DC component, e.g. an offset, e.g. d, of the input audio signal representation. According to an embodiment, the DC component is removed before applying (or right before applying) a scaling which reverses a windowing, for example, before a division by a window value. The DC component is, for example, selectively removed in overlap region with a subsequent processing unit or frame. In other words, the DC component is at least partially removed in an end portion of the input audio signal representation. According to an embodiment the DC component is only removed in the end portion of the input audio signal representation. This is, for example, based on the idea that only in the end-portion a lack of a subsequent processing unit (for performing an overlap-add) results in an error in the processed audio signal representation caused by the un-windowing, which can be minimized by removing the DC component in the end portion. Thus, a factor influencing the un-windowing is at least partially removed, to improve the accuracy of the apparatus.

According to an embodiment, the un-windowing is configured to scale a DC-removed or DC-reduced version of the input audio signal representation in dependence on a window value (or window values) in order to obtain the processed audio signal representation. The window value is, for example, a value of a window function representing a windowing of a first signal or an intermediate signal, used for a provision of the input audio signal representation. Thus, the window values can comprise values, for example, for all times of the current time frame of the input audio signal representation, which were for example multiplied with the first or the intermediate signal to provide the input audio signal representation. Thus, the scaling of the DC-removed or DC-reduced version of the input audio signal representation can be performed in dependence on a window function or window value, for example, by dividing the DC-removed or DC-reduced version of the input audio signal representation by the window value or by values of the window function. Thus, the un-windowing undoes a windowing applied to the first signal or the intermediate signal for a provision of the input audio signal representation very effectively. Because of the usage of the DC-removed or DC-reduced version, the un-windowing results in a small or nearly no deviation of the processed audio signal representation from a result of an overlap-add between subsequent processing units of the input audio signal representation.

According to an embodiment, the un-windowing is configured to at least partially re-introduce a DC component, for example an offset, after a scaling of a DC-removed or DC-reduced version of the input audio signal. The scaling can be window-value-based, as explained above. In other words the scaling can represent an un-windowing performed by the apparatus. With the re-introduction of the DC component, a very accurate processed audio signal representation can be provided by the un-windowing. This is based on the idea that it is more efficient and accurate to first scale a DC-removed or DC-reduced version of the input audio signal based on a windowing used for a provision of the input audio signal before re-introducing the DC component, because a scaling of a version of the input audio signal with the DC component can result in a large amplification of the input audio signal and thus in a high inaccuracy of a provision of the processed audio signal representation by the un-windowing.

According to an embodiment, the un-windowing is configured to determine the processed audio signal representation $y_r[n]$ on the basis of the input audio signal representation y[n] according to $$y_r[n] = \frac{(y[n] - d)}{w_a[n]} + d,\ n \in [n_s; n_e],$$

wherein d is a DC component. The value d can alternatively represent a DC offset, as for example explained above. The DC component d represents, for example, a DC offset in a current processing unit or frame of the input audio signal representation, or in a portion thereof, like an end portion. The value n is a time index wherein $n_s$ is a time index of a first sample of an overlap region, for example, between a current processing unit or frame and a subsequent processing unit or frame and the value $n_e$ is a time index of a last sample of the overlap region. The value of function $w_a[n]$ is an analysis window used for a provision of the input audio signal representation, for example in a time frame between $n_s$ and $n_e$. According to an embodiment, the analysis window $w_a[n]$ represents a window value as described further above. Thus, according to the equation introduced, the DC component is removed from the input audio signal representation and this version of the input audio signal representation is scaled by the analysis window and afterwards, the DC component is re-introduced by an addition. Thus, the un-windowing is adapted to the DC component to minimize errors in a provision of the processed audio signal representation.

According to an embodiment the apparatus is configured to perform the un-windowing according to the above mentioned equation only in the end portion of a current processing unit, i.e. a given processing unit, and to perform a different un-windowing, e.g. a common un-windowing like a static un-windowing or an adaptive un-windowing, and possibly an overlap-add-functionality in a rest of the current time frame.

According to an embodiment, the apparatus is configured to determine the DC component using one or more values of the input audio signal representation, for example of the time domain signal to which the un-windowing is to be applied, which lie in a time portion in which an analysis window used in a provision of the input audio signal representation comprises one or more zero values. These zero values can, for example, represent a zero padding of the analysis window used in the provision of the input audio signal representation. An analysis window with zero padding is, for example, used in the provision of the input audio signal, for example, before a time-domain to frequency-domain conversion, a processing in the frequency domain and a frequency-domain to time-domain conversion is performed, which provides the input audio signal. The described time-domain to frequency-domain conversion and/or the described frequency-domain to time-domain conversion can optionally be performed in this embodiment and/or in one of the following embodiments using an aliasing cancellation or not using an aliasing cancellation. According to an embodiment, a value of the input audio signal representation which lies in a time portion in which the analysis window used in the provision of the input audio signal representation comprises a zero value is used as an approximated value of the DC component. Alternatively, an average of a plurality of values of the input audio signal representation, which lie in the time portion in which the analysis window used in the provision of the input audio signal representation comprises a zero value is used as the approximated value of the DC component. Thus the DC component resulting out of the windowing and processing of a signal to provide the input audio signal can be determined in a very easy and efficient manner and can be used to improve the un-windowing performed by the apparatus.

According to an embodiment, the apparatus is configured to obtain the input audio signal representation using a spectral domain-to-time domain conversion. The spectral domain-to-time domain conversion can also be understood, for example, as a frequency domain-to-time domain conversion. According to an embodiment, the apparatus is configured to use a filter bank as the spectral domain-to-time domain conversion. Alternatively, the apparatus is, for example, configured to use an inverse discrete Fourier transform or an inverse discrete cosine transform as the spectral domain-to-time domain conversion. Thus, the apparatus is configured to perform a processing of an intermediate signal to obtain the input audio signal representation. According to an embodiment, the apparatus is configured to use processing parameters related to the spectral domain-to-time domain conversion for a provision of the input audio signal representation. Thus, the processing parameters influencing the un-windowing performed by the apparatus can be determined by the apparatus very fast and accurately since the apparatus is configured to perform the processing and it is not necessary for the apparatus to receive the processing parameters from a different apparatus performing the processing to provide the input audio signal representation to the inventive apparatus.

An embodiment according to this invention is related to an audio signal processor for providing a processed audio signal representation on the basis of an audio signal to be processed. The audio signal processor is configured to apply an analysis windowing to a time domain representation of a processing unit, e.g. a frame or a time segment, of an audio signal to be processed, to obtain a windowed version of the time domain representation of the processing unit of the audio signal to be processed. Furthermore, the audio signal processor is configured to obtain a spectral domain representation, e.g. a frequency domain representation, of the audio signal to be processed on the basis of the windowed version. Thus, for example a forward frequency transform, like, for example, a DFT, is used to obtain the spectral domain representation. For example, the frequency transform is applied to the windowed version of the audio signal to be processed to obtain the spectral domain representation. The audio signal processor is configured to apply a spectral domain processing, for example a processing in the frequency domain, to the obtained spectral domain representation, to obtain a processed spectral domain representation. On the basis of the processed spectral domain representation, the audio signal processor is configured to obtain a processed time domain representation, e.g. using an inverse time frequency transform. The audio signal processor comprises an apparatus as described herein, wherein the apparatus is configured to obtain the processed time domain representation as its input audio signal representation, and to provide, on the basis thereof, the processed and, for example, un-windowed audio signal representation. According to an embodiment, the apparatus is configured to receive the one or more processing parameters used for the adaptation of the un-windowing from the audio signal processor. Thus, the one or more processing parameters can comprise parameters relating to the analysis windowing performed by the audio signal processor, processing parameters relating to, for example, a frequency transform to obtain the spectral domain representation of the audio signal to be processed, parameters relating to a spectral domain processing performed by the audio signal processor and/or parameters relating to an inverse time frequency transform to obtain the processed time domain representation by the audio signal processor.

According to an embodiment, the apparatus is configured to adapt the un-windowing using window values of the analysis windowing. The window values represent, for example, processing parameters. The window values represent, for example, the analysis windowing applied to the time domain representation of the processing unit.

An embodiment is related to an audio decoder for providing a decoded audio representation on the basis of an encoded audio representation. The audio decoder is configured to obtain a spectral domain representation, e.g. a frequency domain representation, of an encoded audio signal on the basis of the encoded audio representation. Furthermore, the audio decoder is configured to obtain a time domain representation of the encoded audio signal on the basis of the spectral domain representation, for example, using a frequency-domain to time-domain conversion. The audio decoder comprises an apparatus according to one of the herein described embodiments, wherein the apparatus is configured to obtain the time domain representation as its input audio signal representation and to provide, on the basis thereof, the processed and, for example, un-windowed audio signal representation as the decoded audio representation.

According to an embodiment, the audio decoder is configured to provide the, for example, complete audio signal representation of a given processing unit, for example, frame or time segment, before a subsequent processing unit, for example, frame or time segment, which temporally overlaps with the given processing unit, is decoded. Thus, it is possible with the audio decoder to only decode the given processing unit, without the necessity to decode forthcoming units, i.e. subsequent processing units, of the encoded audio representation. Also, a low delay can be achieved.

An embodiment is related to an audio encoder for providing an encoded audio representation on the basis of an input audio signal representation. The audio encoder comprises an apparatus according to one of the herein described embodiments, wherein the apparatus is configured to obtain a processed audio signal representation on the basis of the input audio signal representation. The audio encoder is configured to encode the processed audio signal representation. Thus an advantageous encoder is proposed, which can perform the encoding with a short delay, because an enhanced un-windowing, applied by the apparatus, is used to encode, for example, a given processing unit, without already processing a subsequent processing unit.

According to an embodiment the audio encoder is configured to optionally obtain a spectral domain representation on the basis of the processed audio signal representation. The processed audio signal representation is, for example, a time domain representation. The audio encoder is configured to encode the spectral domain representation and/or the time domain representation, to obtain the encoded audio representation. Thus, for example, the herein described un-windowing, performed by the apparatus, can result in a time domain representation, and encoding of the time domain representation is advantageous, since the encoded representation results in a shorter delay than, for example, an encoder using a full overlap-add for providing the processed audio signal representation. According to an embodiment the encoder in, for example, a system is a switched time domain/frequency domain encoder.

According to an embodiment the apparatus is configured to perform a downmix of a plurality of input audio signals, which form the input audio signal representation, in a spectral domain, and to provide a downmixed signal as the processed audio signal representation.

An embodiment according to the invention is related to a method for providing a processed audio signal representation on the basis of input audio signal representation, which may be considered as the input audio signal of the apparatus. The method comprises applying an un-windowing in order to provide the processed audio signal representation on the basis of the input audio signal representation. The un-windowing is for example an adaptive un-windowing, which, for example, at least partially reverses an analysis windowing used for a provision of the input audio signal representation. Furthermore, the method comprises adapting the un-windowing in dependence on one or more signal characteristics and/or in dependence on one or more processing parameters used for a provision of the input audio signal representation. The one or more signal characteristics are, for example, of the input audio signal representation or of an intermediate representation from which the input audio signal representation is derived. The signal characteristics can comprise a DC component d.

The method is based on the same considerations as the apparatus mentioned above. The method can be optionally supplemented by any features, functionalities and details described herein also with respect to the apparatus. Said features, functionalities and details can be used both individually and in combination.

An embodiment relates to a method for providing a processed audio signal representation on the basis of an audio signal to be processed. The method comprises applying an analysis windowing to a time domain representation of a processing unit, for example a frame or a time segment, of an audio signal to be processed, to obtain a windowed version of the time domain representation of the processing unit of the audio signal to be processed. Furthermore, the method comprises obtaining a spectral domain representation, for example a frequency domain representation, of the audio signal to be processed on the basis of the windowed version. According to an embodiment, a forward frequency transform like, for example, a DFT, is used to obtain the spectral domain representation. The forward frequency transform is for example applied to the windowed version of the audio signal to be processed to obtain the spectral domain representation. The method comprises applying a spectral domain processing, for example a processing in the frequency domain, to the obtained spectral domain representation, to obtain a processed spectral domain representation. Furthermore, the method comprises obtaining a processed time domain representation on the basis of the processed spectral domain representation, for example using an inverse time frequency transform, and providing the processed audio signal representation using a method described herein, wherein the processed time domain representation is used as the input audio signal for performing the method.

The method is based on the same considerations as the audio signal processor and/or apparatus mentioned above. The method can be optionally supplemented by any features, functionalities and details described herein also with respect to the audio signal processor and/or apparatus. Said features, functionalities and details can be used both individually and in combination.

An embodiment according to the invention is related to a method for providing a decoded audio representation on the basis of an encoded audio representation. The method comprises obtaining a spectral domain representation, for example a frequency domain representation, of an encoded audio signal on the basis of the encoded audio representation. Furthermore, the method comprises obtaining a time domain representation of the encoded audio signal on the basis of the spectral domain representation and providing a processed audio signal representation using a method described herein, wherein the time domain representation is used as the input audio signal for performing the method, and wherein the processed audio signal representation may constitute the decoded audio representation.

The method is based on the same considerations as the audio decoder and/or apparatus mentioned above. The method can be optionally supplemented by any features, functionalities and details described herein also with respect to the audio decoder and/or apparatus. Said features, functionalities and details can be used both individually and in combination.

An embodiment according to the invention is related to a computer program having a program code for performing, when running on a computer, a method described herein.

BRIEF DESCRIPTION OF THE DRAWINGS

Embodiments of the present invention will be detailed subsequently referring to the appended drawings, in which.

DETAILED DESCRIPTION OF THE EMBODIMENTS

Figure 1A:
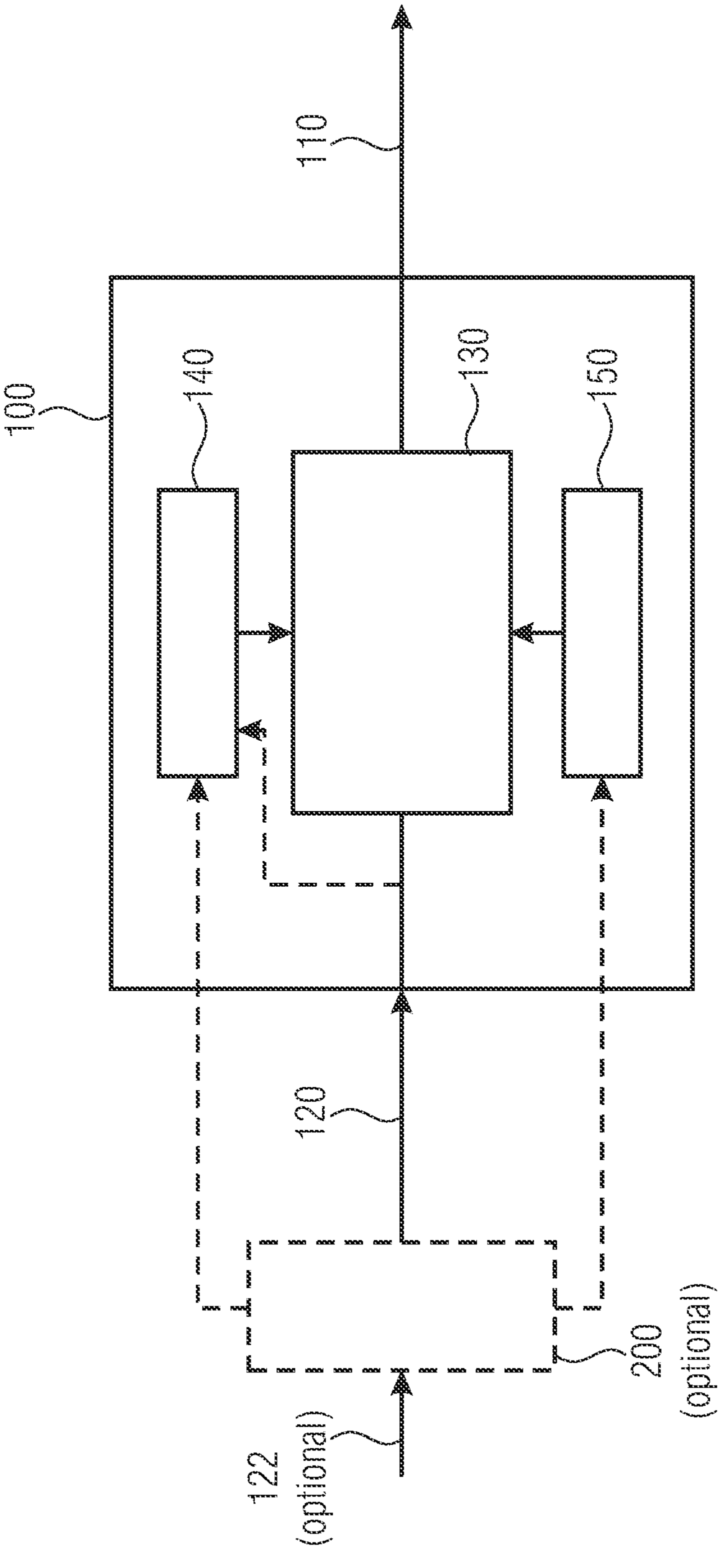
FIG. 1*a* shows a block schematic diagram of an apparatus according to an embodiment of the present invention.

Equal or equivalent elements or elements with equal or equivalent functionality are denoted in the following description by equal or equivalent reference numerals even if occurring in different figures.

In the following description, a plurality of details is set forth to provide a more thorough explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described herein after may be combined with each other, unless specifically noted otherwise.

FIG. 1*a* shows a schematic view of an apparatus 100 for providing a processed audio signal representation 110 on the basis of an input audio signal representation 120. The input audio signal representation 120 can be provided by an optional device 200, wherein the device 200 processes a signal 122 to provide the input audio signal representation 120. According to an embodiment, the device 200 can perform a framing, an analysis windowing, a forward frequency transform, a processing in a frequency domain and/or an inverse time frequency transform of the signal 122 to provide the input audio signal representation 120.

According to an embodiment, the apparatus 100 can be configured to obtain the input audio signal representation 120 from an external device 200. Alternatively, the optional device 200 can be part of the apparatus 100, wherein the optional signal 122 can represent the input audio signal representation 120 or wherein a processed signal, based on the signal 122, provided by the device 200 can represent the input audio signal representation 120.

According to an embodiment, the input audio signal representation 120 represents a time-domain signal after a processing in a spectral domain and a spectral-domain to time-domain conversion.

The apparatus 100 is configured to apply an un-windowing 130, e.g. an adaptive un-windowing, in order to provide the processed audio signal representation 110 on the basis of the input audio signal representation 120. The un-windowing 130, for example, at least partially reverses an analysis windowing used for a provision of the input audio signal representation 120. Alternatively or additionally, the apparatus is, for example, configured to adapt the un-windowing 130 to at least partially reverse the analysis windowing used for the provision of the input audio signal representation 120. Thus, for example, the optional device 200 can apply a windowing to the signal 122 to obtain the input audio signal representation 120, which can be reversed by the un-windowing 130 (e.g. at least partially).

The apparatus 100 is configured to adapt the un-windowing 130 in dependence on one or more signal characteristics

140 and/or in dependence on one or more processing parameters 150 used for a provision of the input audio signal representation 120. According to an embodiment, the apparatus 100 is configured to obtain the one or more signal characteristics 140 from the input audio signal representation 120 and/or from the device 200, wherein the device 200 can provide one or more signal characteristics 140 of the optional signal 122 and/or of intermediate signals resulting from a processing of the signal 122 for the provision of the input audio signal representation 120. Thus, the apparatus 100 is, for example, configured to not only use signal characteristics 140 of the input audio signal representation 120 but alternatively or in addition also from intermediate signals or an original signal 122, from which the input audio signal representation 120 is, for example, derived. The signal characteristics 140, may, for example, comprise amplitudes, phases, frequencies, DC components, etc. of signals relevant for the processed audio signal representation 110. According to an embodiment, the processing parameters 150 can be obtained from the optional device 200 by the apparatus 100. The processing parameters, for example, define configurations of methods or processing steps applied to signals, for example, to the original signal 122 or to one or more intermediate signals, for a provision of the input audio signal representation 120. Thus, the processing parameters 150 can represent or define a processing the input audio signal representation 120 underwent.

According to an embodiment, the signal characteristics 140 can comprise one or more parameters describing signal characteristics of a time domain representation of a time domain signal, i.e. the input audio signal representation 120, of a current processing unit or frame, e.g. a given processing unit, wherein the time domain signal results, for example, after a processing in a frequency domain and a frequency-domain to time-domain conversion of a windowed and processed version of signal 122. Additionally or alternatively, the signal characteristics 140 can comprise one or more parameters describing signal characteristics of a frequency domain representation of an intermediate signal, from which a time domain input audio signal, e.g. the input audio signal representation 120 to which the un-windowing is applied, is derived.

According to an embodiment, the signal characteristics 140 and/or the processing parameters 150 as described herein can be used by the apparatus 100 to adapt the un-windowing 130 as described in the following embodiments. The signal characteristics can, for example, be obtained using a signal analysis of signal 120, or of any signal from which signal 120 is derived.

According to an embodiment, the apparatus 100 is configured to adapt the un-windowing 130 to at least partially compensate for a lack of signal values of a subsequent processing unit, e.g., a subsequent frame. The optional signal 122 is, for example, windowed by the optional device 200 into processing units, wherein a given processing unit can be un-windowed 130 by the apparatus 100. With a common approach, an un-windowed given processing unit undergoes an overlap-add with a previous processing unit and a subsequent processing unit. With the herein proposed adaptation of the un-windowing 130, the subsequent processing unit is not needed because the un-windowing 130 can approximate the processed audio signal representation 110, as if the overlap-add with a subsequent frame is performed without actually performing an overlap-add with the subsequent frame.

In the following with respect to FIG. 1*b* to FIG. 1*d* a more thorough description of frames, i.e. processing units, and their overlap regions is presented for an apparatus shown in FIG. 1*a* according to an embodiment.

Figure 1B:
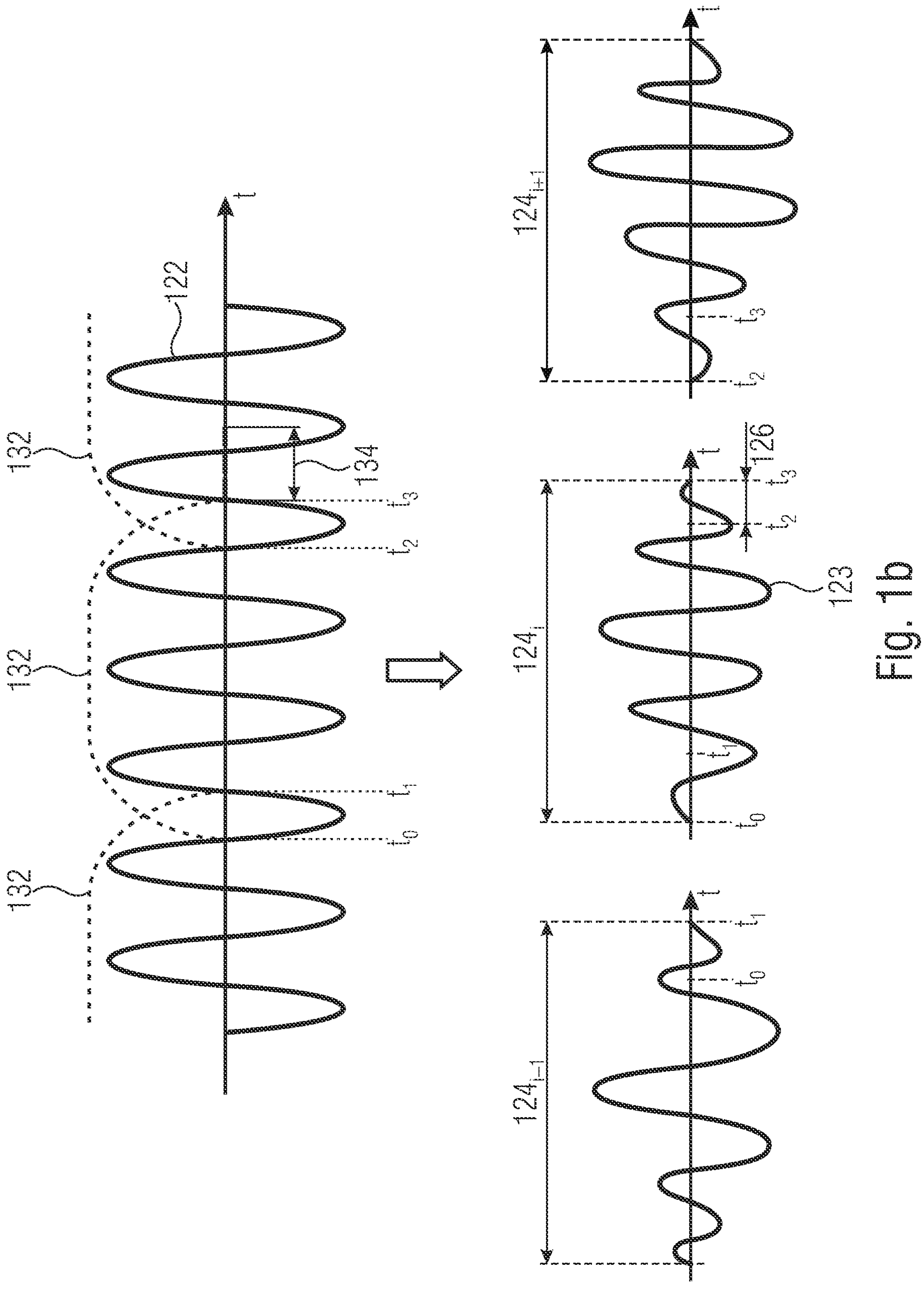
FIG. 1*b* shows a schematic diagram of a windowing of an audio signal for a provision of an input audio signal representation, which can be un-windowed by an apparatus, according to an embodiment of the present invention.

In FIG. 1*b* the analysis windowing, which can be performed by the optional device 200 as one of the steps to obtain the intermediate signal 123 according to an embodiment of the present invention, is shown. According to an embodiment, the intermediate signal 123 can be processed further by the optional device 200 for providing the input audio signal representation, as shown in FIG. 1*c* and/or FIG. 1*d*.

FIG. 1*b* is only a schematic view to show a windowed version of a previous processing unit $\mathbf{124}_{i-1}$, a windowed version of a given processing unit $\mathbf{124}_i$ and a windowed version of a subsequent processing unit $\mathbf{124}_{i+1}$, wherein the index i represents a natural number of at least 2. According to an embodiment, the previous processing unit $\mathbf{124}_{i-1}$, the given processing unit $\mathbf{124}_i$ and the subsequent processing unit $\mathbf{124}_{i+1}$ can be achieved by a windowing 132 applied to a time domain signal 122. According to an embodiment, the given processing unit $\mathbf{124}_i$ can overlap with the previous processing unit $\mathbf{124}_{i+1}$ in a time period of $t_0$ to $t_1$ and can overlap with the subsequent processing unit $\mathbf{124}_{i+1}$ in a time period $t_2$ to $t_3$. It is clear that FIG. 1*b* is only schematic and that signals after the analysis windowing can look differently than shown in FIG. 1*b*. It should be noted that the windowed processing units $\mathbf{124}_{i-1}$ to $\mathbf{124}_{i+1}$ may be transformed into a frequency domain, processed in the frequency domain, and transformed back into the time domain. In FIG. 1*c* the previous processing unit $\mathbf{124}_{i+1}$, the given processing unit $\mathbf{124}_i$ and the subsequent processing unit $\mathbf{124}_{i+1}$ is shown and in FIG. 1*d* the previous processing unit $\mathbf{124}_{i-1}$ and the given processing unit $\mathbf{124}_{i-1}$, is shown, wherein the un-windowing applied by the apparatus can be based on the processing units 124. According to an embodiment, the previous processing unit $\mathbf{124}_{i-1}$ can be associated with a past frame and the given processing unit $\mathbf{124}_{i-1}$, can be associated with a current frame.

Commonly, an overlap-add is performed for frames comprising these overlap regions $t_0$ to $t_1$ and/or $t_2$ to $t_3$ ($t_2$ to $t_3$ can be associated with $n_s$ to $n_e$ in FIG. 1*d*) after a synthesis windowing (which is typically applied after a transform back to the time domain or even together with said transform back to the time domain) to provide a processed audio signal representation. In contrast, the inventive apparatus 100, shown in FIG. 1*a*, can be configured to apply the un-windowing 130 (i.e. an undoing of an analysis windowing), whereby an overlap-add of the given processing unit $\mathbf{124}_i$ with a subsequent processing unit $\mathbf{124}_{i+1}$ in the time period $t_2$ to $t_3$ is not necessary, see FIG. 1*c* and FIG. 1*d*. This is, for example, achieved by an adaptation of the un-windowing to at least partially compensate a lack of signal values of the subsequent processing unit $\mathbf{124}_{i+1}$, as shown in FIG. 1*c*. Thus, for example, the signal values in the time period $t_2$ to $t_3$ of the subsequent processing unit $\mathbf{124}_{i+1}$ are not needed and an error, which may occur because of this lack of the signal values, can be compensated by the un-windowing 130 by the apparatus 100 (for example, using an upscaling of values of the signal 120 in an end portion of the given processing unit, which is adapted to signal characteristics and/or processing parameters to avoid or reduce artifacts). This can result in an additional delay reduction from signal approximation.

Figure 1C:
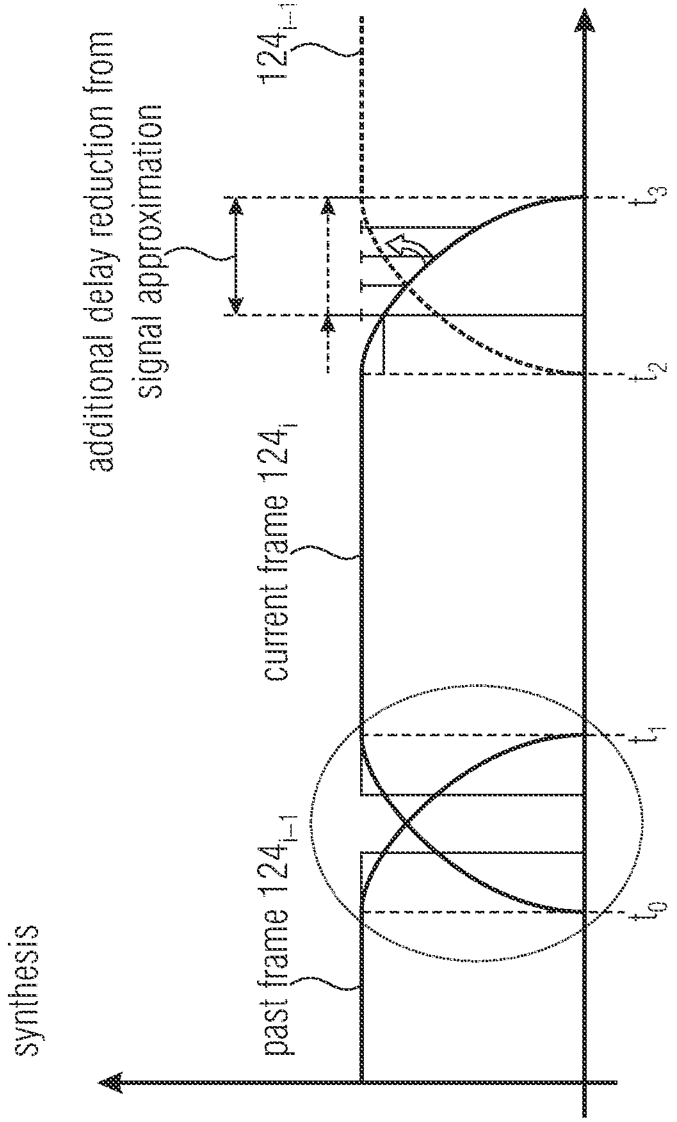
FIG. 1*c* shows a schematic diagram of an un-windowing, e.g. a signal approximation, applied by an apparatus according to an embodiment of the present invention.
Figure 1D:
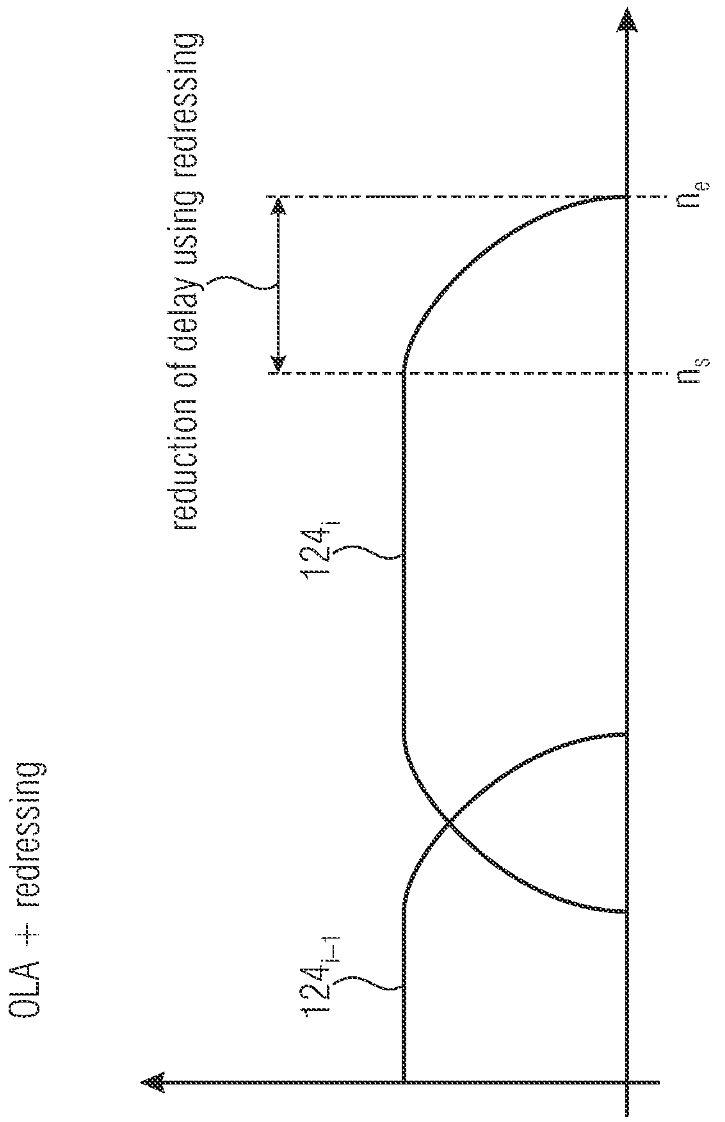
FIG. 1*d* shows a schematic diagram of an un-windowing, e.g. a redressing, applied by an apparatus according to an embodiment of the present invention.

If the un-windowing is applied, for example, to the input audio signal representation provided by a processing of the intermediate signal 123, the un-windowing is configured to provide reconstructed version of a given processing unit $\mathbf{124}_i$, i.e. a time segment, frame, of the processed audio signal representation 110 before a subsequent processing unit $\mathbf{124}_{i+1}$, which at least partially temporally overlaps the given processing unit, in the time period $t_2$ to $t_3$, is available, see FIG. 1*c* and/or FIG. 1*d*. Thus, the apparatus 100 does not need to look ahead, since it is sufficient to only un-window the given processing unit $\mathbf{124}_i$.

According to an embodiment, the apparatus 100 is configured to apply an overlap-add of the given processing unit $\mathbf{124}_i$ and the previous processing unit $\mathbf{124}_{i-1}$ in the time period $t_0$ to $t_1$, since the previous processing unit $\mathbf{124}_{i-1}$ is, for example, already processed by the apparatus 100.

According to an embodiment, the apparatus 100 is configured to adapt the un-windowing 130 to reduce or to limit a deviation between a processed audio signal representation (for example, an un-windowed version of the given processing unit $\mathbf{124}_i$ of the input audio signal representation) and a result of an overlap-add between subsequent processing units of the input audio signal representation. Thus, the un-windowing is adapted such that nearly no deviation occurs between the processed audio signal representation, e.g. of the given processing unit $\mathbf{124}_i$, and a processed audio signal representation which would be obtained using a conventional overlap-add with the subsequent processing unit, wherein the new un-windowing by the apparatus 100 has less delay than common methods, since the subsequent processing unit $\mathbf{124}_{i+1}$ does not have to be considered in the un-windowing, which results in an optimization of a delay needed to process a signal for providing the processed audio signal representation 110.

Figure 8:
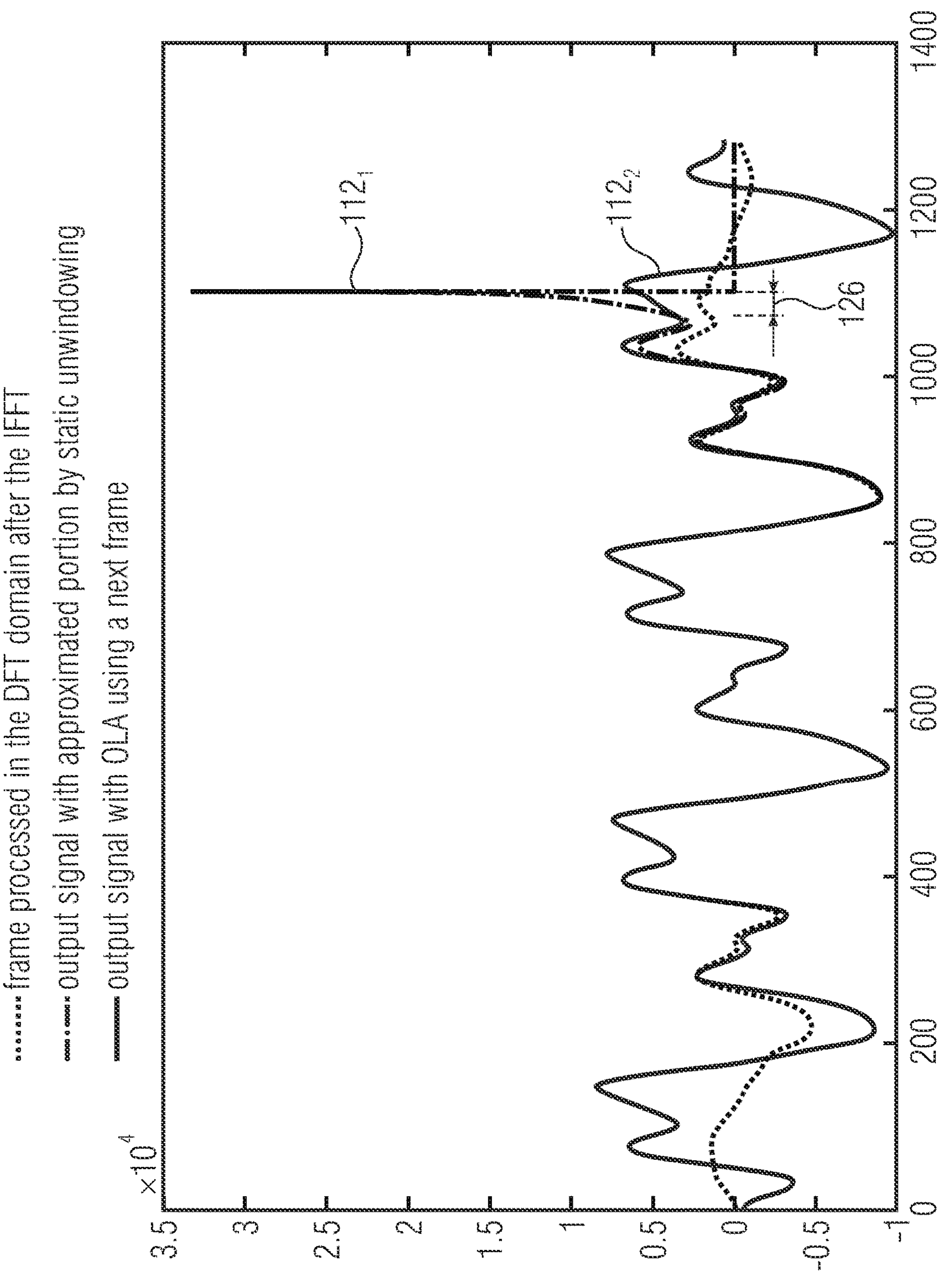
FIG. 8 shows an example for a mismatch between approximation with static un-windowing and OLA with a following frame after processing in the DFT domain and the inverse DFT.
Figure 9:
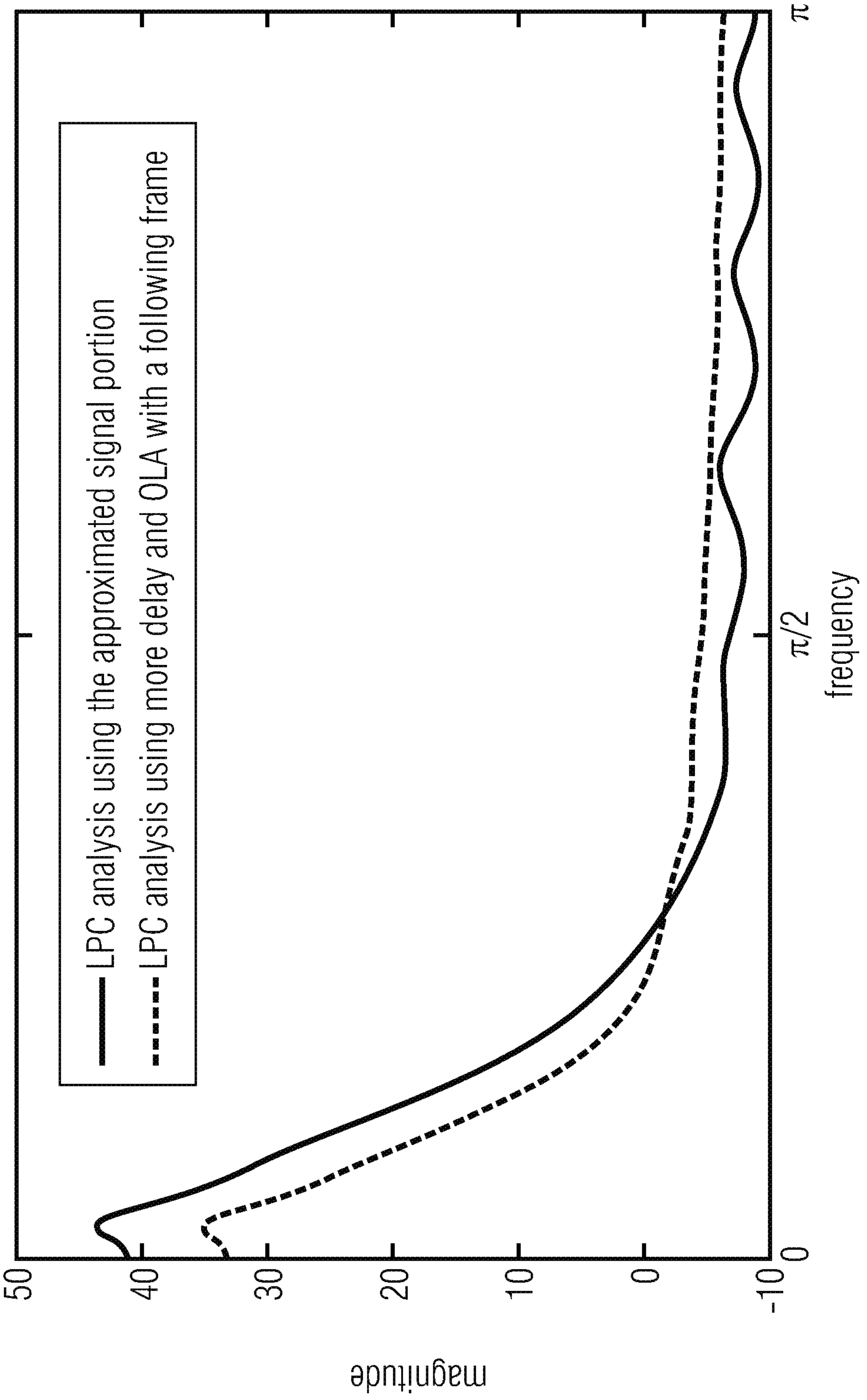
Fig. 9 (PRIOR ART)
FIG. 9 shows an example of a LPC analysis done on the approximated signal portion of the previous example.

According to an embodiment, the apparatus 100, shown in FIG. 1*a*, is configured to adapt the un-windowing 130 to limit values of the processed audio signal representation 110. Thus, for example, high values, e.g. at least in an end portion 126, see FIG. 1*b* or FIG. 8, of a processing unit, e.g. in a time period $t_2$ to $t_3$ of the given processing unit $\mathbf{124}_i$, can be limited by the un-windowing (for example, by a selective reduction of an upscaling factor, e.g., in the case of a slow convergence to zero of the input audio signal representation at an end 126 of the given processing unit $\mathbf{124}_i$). Thus, it can be avoided that a large deviation as it might occur between an output signal $\mathbf{112}_1$ with an approximated portion obtained by static un-windowing and an output signal $\mathbf{112}_2$ obtained using OLA with a next frame, will occur, see FIG. 8. According to an embodiment, the apparatus 100 is configured to use weighing values for performing the unweighing which are smaller than multiplicative inverses for corresponding values of an analysis windowing 132 used to obtain the intermediate signal 123, which can be processed further for a provision of the input audio signal representation 120, for example, at least for scaling an end portion 126 of a processing unit of the input audio signal representation 120.

According to an embodiment, the un-windowing 130 can apply a scaling to the input audio signal representation 120, wherein the scaling in the end portion 126 in the time period $t_2$ to $t_3$, see FIG. 1*b*, of the given processing unit $\mathbf{124}_i$ of the input audio signal representation 120 is reduced in some situations when compared to a case in which the input audio signal representation 120, e.g. smoothly, converges to zero in the end portion 126 of the given processing unit $\mathbf{124}_i$. Thus, the un-windowing 130 can be adapted by the apparatus 100 such that the input audio signal representation 120 can undergo different scalings for different time periods in the given processing unit $\mathbf{124}_i$. Thus, for example, at least in the end portion 126 of the given processing unit $\mathbf{124}_i$ of the input audio signal representation 120, the un-windowing is adapted, to thereby limit a dynamic range of the processed audio signal representation 110. Thus, high peaks as shown for the output signal $\mathbf{112}_1$ in the end portion 126 in FIG. 8 can be avoided by the inventive apparatus 100, which is configured to adapt the un-windowing 130.

According to an embodiment, different given processing units $\mathbf{124}_i$, i.e. different portions of the input audio signal representation 120, can be un-windowed by different scalings, whereby an adaptive un-windowing is realized. Thus, for example, the signal 122 can be windowed by the device 200 into a plurality of processing units 124 and the apparatus 100 can be configured to perform an un-windowing for each processing unit 124 (e.g. using different un-windowing parameters) to provide the processed audio signal representation 110.

According to an embodiment, the input audio signal representation 120 can comprise a DC component, e.g. an offset, which can be used by the apparatus 100 to adapt the un-windowing 130. The DC component of the input audio signal representation can, for example, result from the processing performed by the optional device 200 for providing the input audio signal representation 120. According to an embodiment, the apparatus 100 is configured to at least partially remove the DC component of the input audio signal representation, by, for example, applying the un-windowing 130 and/or before applying a scaling, i.e. the un-windowing 130, which reverses the windowing, e.g. the analysis windowing. According to an embodiment, the DC component of the input audio signal representation can be removed by the apparatus before a division by a window value, which represents, for example, the un-windowing. According to an embodiment, the DC component can at least partially be removed selectively in the overlap region, represented, for example, by the end portion 126, with the subsequent processing unit $\mathbf{124}_{i+1}$. According to an embodiment, the un-windowing 130 is applied to a DC-removed or DC-reduced version of the input audio signal representation 120, wherein the un-windowing can represent a scaling in dependence on a window value in order to obtain the processed audio signal representation 110. The scaling is, for example, applied by dividing the DC-removed or DC-reduced version of the input audio signal representation 120 by the window value. The window value is for example represented by the window 132, shown in FIG. 1*b*, wherein, for example, for each time step in the given processing unit $\mathbf{124}_i$, a window value exists.

The DC component of the input audio signal representation 120 can be re-introduced, e.g. at least partially, after a scaling, e.g. a window-value-based scaling, of the DC-removed or DC-reduced version of the input audio signal representation 120. This is based on the idea that the DC component can result in an error occurring in the un-windowing, and by removing it before the un-windowing and re-introducing the DC component after the un-windowing, this error is minimized.

According to an embodiment the un-windowing 130 is configured to determine the processed audio signal representation $y_r[n]$ 110 on the basis of the input audio signal representation y[n] 120 according to $$y_r[n] = \frac{(y[n] - d)}{w_a[n]} + d,\ n \in [n_s; n_e].$$

The DC component or DC offset, for example, in a current processing unit or frame of the input audio signal representation, or in a portion thereof can be represented by the value d. The Index n is a time index, representing, for example time steps or a continuous time in a time interval $n_s$ to $n_e$ (see FIG. 1*d*), wherein $n_s$ is a time index of a first sample of an overlap region, e.g. between a current processing unit or frame and a subsequent processing unit or frame, and wherein $n_e$ is a time index of a last sample of the overlap region. The value or function $w_a[n]$ is an analysis window 132 used for a provision of the input audio signal representation 120, e.g. in a time frame between $n_s$ and $n_e$.

In other words, in an advantageous embodiment it is assumed that the processing adds e.g. a DC offset d to the processed frame of the signal, and the redressing (or un-windowing) is adapted to this DC component.

$$y_r[n] = \frac{(y[n] - d)}{w_a[n]} + dn \in [n_s; n_e]$$

In a further advantageous embodiment, this DC component is e.g. approximated by employing an analysis window with zero padding and takes the value of a sample within the zero padding range after processing and inverse DFT as an approximated value d for the added DC component.

According to an embodiment, the apparatus 100 is configured to determine the DC component using one or more values of the input audio signal representation 120 which lie in a time portion 134, see FIG. 1*b*, in which an analysis window 132 used in a provision of the input audio signal representation 120 comprises one or more zero values. This time portion 134 can represent a zero padding (e.g., a contiguous zero padding), which can be optionally applied to determine the DC component of the input audio signal representation 120. While the zero padding in the time portion 134 of the analysis window 132 should result in zero values of a windowed signal in this time portion 134, a processing of this windowed signal can result in a DC offset in this time portion 134, defining the DC component. According to an embodiment, the DC component can represent a mean offset of the input audio signal representation 120 in the time portion 134 (see FIG. 1*b*).

In other words the apparatus 100 described in the context of FIG. 1*a* to FIG. 1*d* can perform an adaptive Un-Windowing for Low Delay Frequency Domain Processing according to an embodiment. This invention discloses a novel approach for un-windowing or redressing (see FIG. 1*c* or FIG. 1*d*) a time signal after, for example, processing with a filter bank without the need for an overlap-add with a following frame to obtain a time signal that is a good approximation of the fully processed signal after overlap-add with a following frame, leading, for example, to a lower delay for a signal processing system where a time signal is further processed after a processing using a filter bank.

FIG. 1*c* and FIG. 1*d* can show the same or an alternative un-windowing performed by the herein proposed apparatus 100, wherein an overlap-add (OLA) can be performed between the past frame and the current frame and no subsequent processing unit $\mathbf{124}_{i+1}$ is needed.

To ensure a good approximation of the redressed signal portion (e.g. of processed audio signal representation at the end portion 126) and avoid instead of a static un-windowing with the inverse of the applied analysis window, we propose, for example, an adaptive redressing $$y_r[n]=f(y[n],w_a[n]),\ n\in[n_s;n_e]$$

The adaption (e.g., of the un-windowing function mapping y[n] onto $y_r$ [n]) may be based on the analysis window $w_a$ and e.g. on one or more of the following parameters

- Parameters available and used in the processing in the frequency domain of the current frames and possibly past frames
- Parameters derived from the frequency domain representation of the current frame
- Parameters derived from the time signal of the current frame after processing in the frequency domain and the inverse frequency transform Advantages of the new method and apparatus are a better approximation of the real processed and overlap-added signal in the area of the right overlap part when no following frame is available yet.

The herein proposed apparatus 100 and method can be used in the following areas of applications:

- Low delay processing systems using further processing of a signal after processing it in the frequency domain using a forward and inverse frequency transform with overlap-add.
- For the usage in a parametric stereo encoder or stereo decoder or stereo encoder/decoder system where in the encoder a downmix is created by processing the stereo input signals in the frequency domain and the frequency domain downmix is transformed back to the time domain for a further mono encoding using a state of the art mono speech/music encoder like EVS.
- For usage in a future stereo extension of the EVS coding standard, namely in a DFT stereo part of this system.
- An Embodiment can be used in a 3GPP IVAS apparatus or system.

Figure 2:
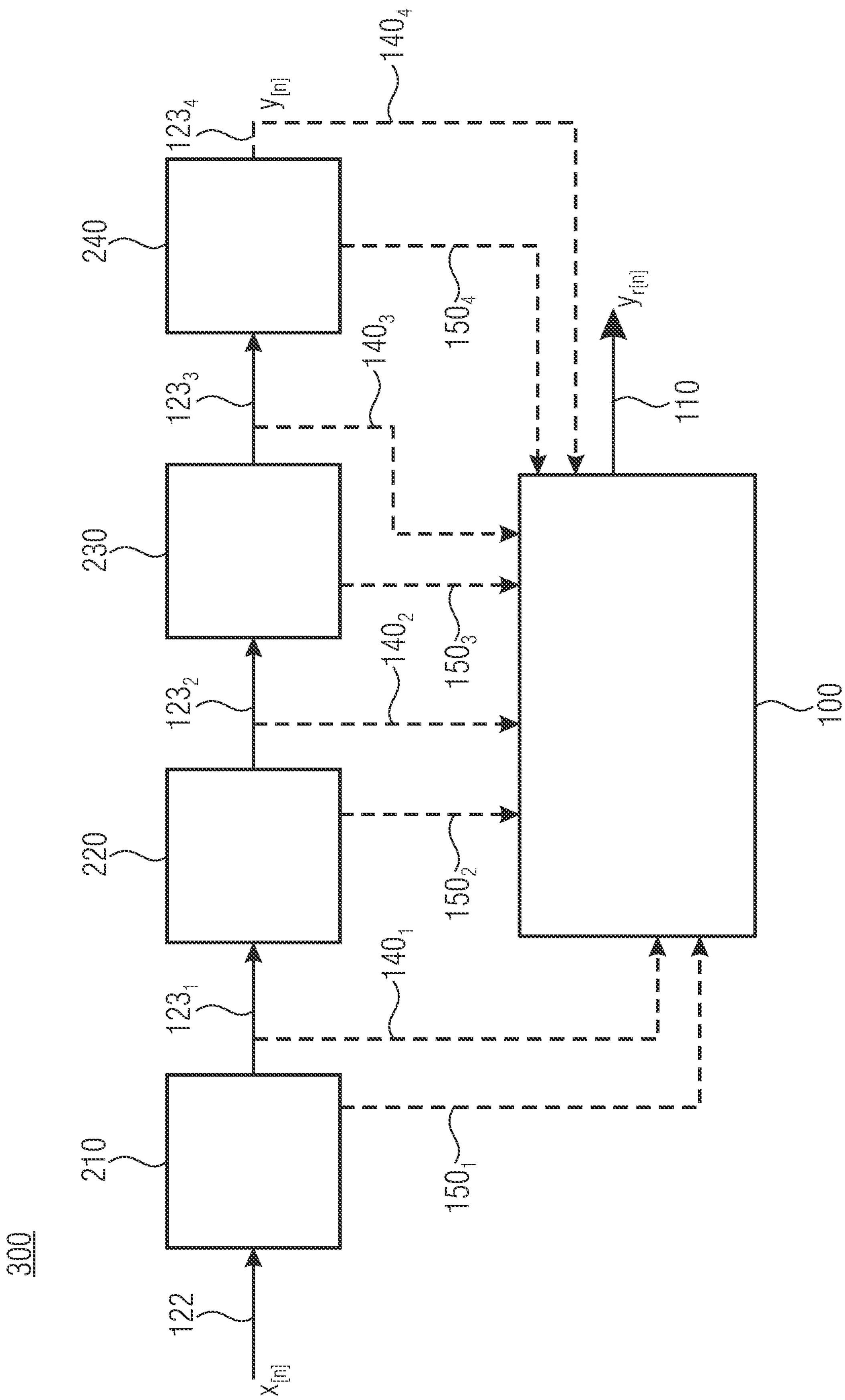
FIG. 2 shows a block schematic diagram of an audio signal processor according to an embodiment of the present invention.

FIG. 2 shows an audio signal processor 300 for providing a processed audio signal representation 110 on the basis of an audio signal 122, i.e. a first signal, to be processed. According to an embodiment, the first signal 122 x[n] can be framed and/or analysis windowed 210 to provide a first intermediate signal $\mathbf{123}_1$, the first intermediate signal $\mathbf{123}_1$ can undergo a forward frequency transform 220 to provide a second intermediate signal $\mathbf{123}_2$, the second intermediate signal $\mathbf{123}_2$ can undergo a processing 230 in a frequency domain to provide a third intermediate signal $\mathbf{123}_3$ and the third intermediate signal $\mathbf{123}_3$ can undergo an inverse time frequency transform 240 to provide a forth intermediate signal $\mathbf{123}_4$. The analysis windowing 210 is, for example, applied by the audio signal processor 300 to a time domain representation of a processing unit, e.g. a frame, of the audio signal 122. The thereby obtained first intermediate signal $\mathbf{123}_1$ represents, for example, a windowed version of the time domain representation of the processing unit of the audio signal 122. The second intermediate signal $\mathbf{123}_2$ can represent a spectral domain representation or a frequency domain representation of the audio signal 122 obtained on the basis of the windowed version, i.e. the first intermediate signal $\mathbf{123}_1$. The processing 230 in the frequency domain can also represent a spectral domain processing and may, for example, comprise a filtering and/or a smoothing and/or a frequency translation and/or a sound effect processing like an echo insertion or the like and/or a bandwidth extension and/or an ambience signal extraction and/or a source separation. Thus, the third intermediate signal $\mathbf{123}_3$ can represent a processed spectral domain representation and the fourth intermediate signal $\mathbf{123}_4$ can represent a processed time domain representation optional on the basis of the processed spectral domain representation, i.e. the third intermediate signal $\mathbf{123}_3$.

According to an embodiment, the audio signal processor 200 comprises an apparatus 100 as, for example, described with regard to FIG. 1*a* and/or FIG. 1*b*, which is configured to obtain the processed time representation $\mathbf{123}_4$ y[n] as its input audio signal representation, and to provide, on the basis thereof, the processed audio signal representation $y_r[n]$ 110. The inverse time frequency transform 240 can represent a spectral domain to time domain conversion, for example, using a filter bank, using an inverse discrete Fourier transform or an inverse discrete cosine transform. Thus, the apparatus 100 is, for example, configured to obtain the input audio signal representation, represented by the fourth intermediate signal $\mathbf{123}_4$, using a spectral domain-to-time domain conversion.

The apparatus is configured to perform an un-windowing, in order to provide the processed audio signal representation 110 $y_r[n]$ on the basis of the input audio signal representation $\mathbf{123}_4$. According to an embodiment, the un-windowing is applied to the fourth intermediate signal $\mathbf{123}_4$. An adaptation of the un-windowing 130 by the apparatus 100 can comprise features and/or functionalities as described with regard to FIG. 1*a* and/or FIG. 1*b*. According to an embodiment, the apparatus 100 can be configured to adapt the un-windowing 130 in dependence on signal characteristics 1401 to 1404 of the intermediate signals $\mathbf{123}_1$ to $\mathbf{123}_4$ and/or in dependence on processing parameters 1501 to 1504 of the respective processing steps 210, 220, 230 and/or 240 used for a provision of the input audio signal representation. For example, it may be concluded from the processing parameters whether it can be expected that input audio signal representation input into the un-windowing comprises a dc offset or is likely to comprise a dc offset or comprises a slow convergence towards zero at an end of a frame. Accordingly, the processing parameters may be used to decide whether and/or how the un-windowing should be adapted.

According to an embodiment the apparatus 100 is configured to adapt the un-windowing using window values of the analysis windowing 210 performed by the audio signal processor 200.

According to an embodiment the apparatus is configured to perform an un-windowing to determine the processed audio signal representation $y_r[n]$ 110 on the basis of the input audio signal representation $y[n]$ $\mathbf{123}_4$ according to $$y_r[n] = \frac{(y[n] - d)}{w_a[n]} + d,\ n \in [n_s; n_e].$$

The value d can represent a DC component or DC offset of the fourth intermediate signal $\mathbf{123}_4$ and $w_a[n]$ can represent an analysis window used for a provision of the input audio signal representation $\mathbf{123}_4$ in the processing step 210. This un-windowing is, for example, performed in a time period $n_s$ to $n_e$ for all times n.

Figure 3:
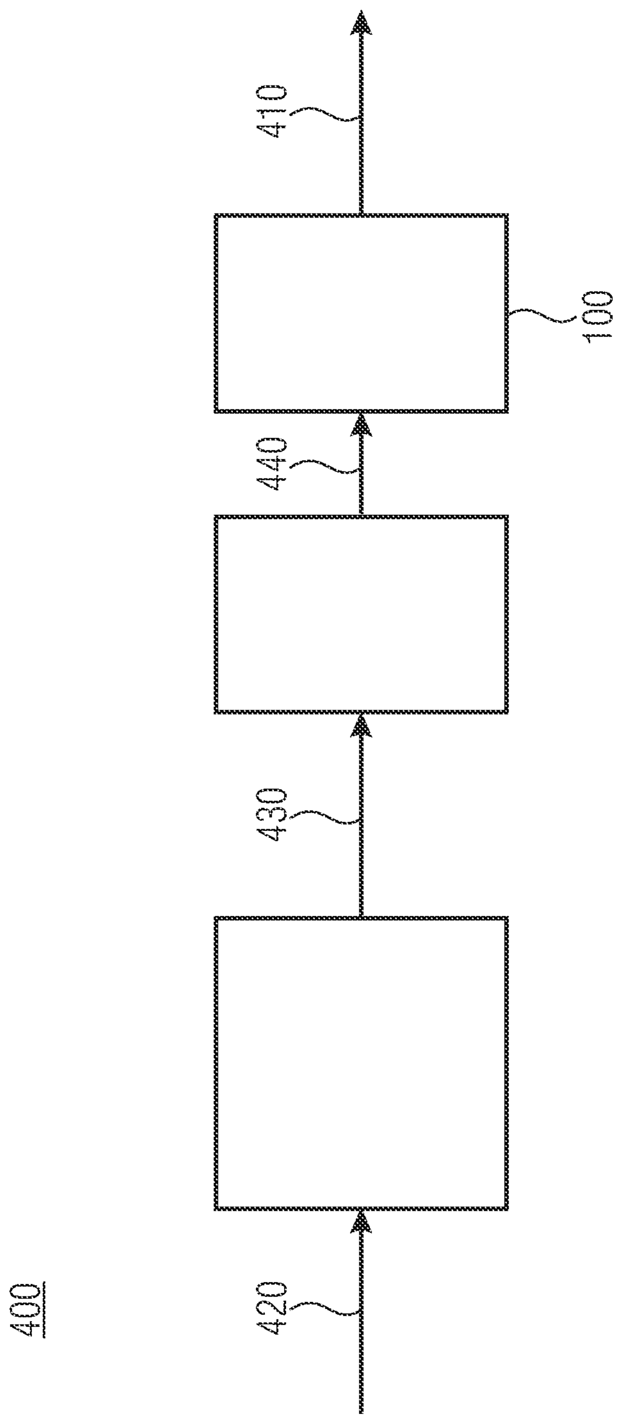
FIG. 3 shows a schematic view of an audio decoder according to an embodiment of the present invention.

FIG. 3 shows a schematic view of an audio decoder 400 for providing a decoded audio representation 410 on the basis of an encoded audio representation 420. The audio decoder 400 is configured to obtain a spectral domain representation 430 of an encoded audio signal on the basis of the encoded audio representation 420. Furthermore, the audio decoder 400 is configured to obtain a time domain representation 440 of the encoded audio signal on the basis of the spectral domain representation 430. Furthermore, the audio decoder 400 comprises an apparatus 100, which can comprise features and/or functionalities as described with regard to FIG. 1*a* and/or FIG. 1*b*. The apparatus 100 is configured to obtain the time domain representation 440 as its input audio signal representation and to provide, on the basis thereof, the processed audio signal representation 410 as the encoded audio representation. The processed audio signal representation 410 is, for example, an un-windowed audio signal representation, because the apparatus 100 is configured to un-window the time domain representation 440.

According to an embodiment the audio decoder 400 is configured to provide the, e.g. complete, decoded audio signal representation 410 of a given processing unit, e.g. frame, before a subsequent processing unit, e.g. frame, which temporally overlaps with the given processing unit is decoded.

Figure 4:
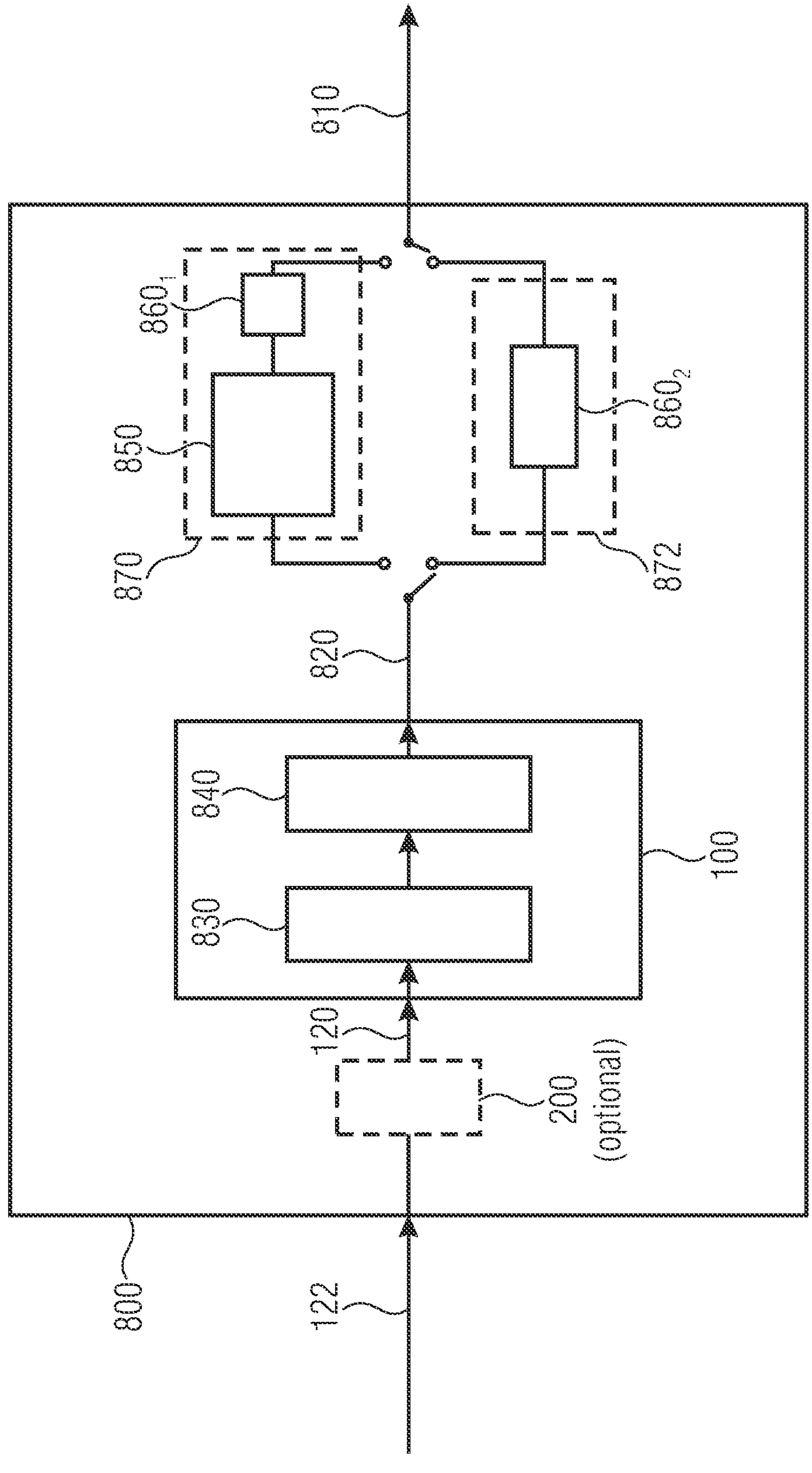
FIG. 4 shows a schematic view of an audio encoder according to an embodiment of the present invention.

FIG. 4 shows a schematic view of an audio encoder 800 for providing an encoded audio representation 810 on the basis of an input audio signal representation 122, wherein the input audio signal representation 122 comprises, for example, a plurality of input audio signals. The input audio signal representation 122 is optionally pre-processed 200 to provide a second input audio signal representation 120 for an apparatus 100. The pre-processing 200 can comprise a framing, an analysis windowing, a forward frequency transform, a processing in a frequency domain and/or an inverse time frequency transform of the signal 122 to provide the second input audio signal representation 120. Alternatively the input audio signal representation 122 can already represent the second input audio signal representation 120.

The apparatus 100 can comprise features and functionalities as described herein, for example, with regard to FIG. 1*a* to FIG. 2. The apparatus 100 is configured to obtain a processed audio signal representation 820 on the basis of the input audio signal representation 122. According to an embodiment the apparatus 100 is configured to perform a downmix of a plurality of input audio signals, which form the input audio signal representation 122 or the second input audio signal representation 120, in a spectral domain, and to provide a downmixed signal as the processed audio signal representation 820. According to an embodiment, the apparatus 100 can perform a first processing 830 of the input audio signal representation 122 or of the second input audio signal representation 120. The first processing 830 can comprise features and functionalities as described with regard to the pre-processing 200. The signal obtained by the optional first processing 830 can be unwindowed and/or further processed 840 to provide the processed audio signal representation 820. The processed audio signal representation 820 is, for example, a time domain signal.

According to an embodiment the encoder 800 comprises a spectral-domain encoding 870 and/or a time-domain encoding 872. As shown in FIG. 4 the encoder 800 can comprise at least one switch $\mathbf{880}_1$, $\mathbf{880}_2$ to change an encoding mode between the spectral-domain encoding 870 and the time-domain encoding 872 (e.g. switching encoding). The encoder switches, for example, in a signal-adaptive manner. Alternatively the encoder can comprise either the spectral-domain encoding 870 or the time-domain encoding 872, without switching between this two encoding modes.

At the spectral-domain encoding 870 the processed audio signal representation 820 can be transformed 850 into a spectral domain signal. This transformation is optional. According to an embodiment the processed audio signal representation 820 represents already a spectral domain signal, whereby no transform 850 is needed.

The audio encoder 800 is, for example, configured to encode $\mathbf{860}_1$ the processed audio signal representation 820. As described above, the audio encoder can be configured to encode the spectral domain representation, to obtain the encoded audio representation 810.

At the time-domain encoding 872 the audio encoder 800 is, for example, configured to encode the processed audio signal representation 820 using a time-domain encoding to obtain the encoded audio representation 810. According to an embodiment an LPC-based encoding can be used, which determines and encodes linear predication coefficients and which determines and encodes an excitation.

Figure 5A:
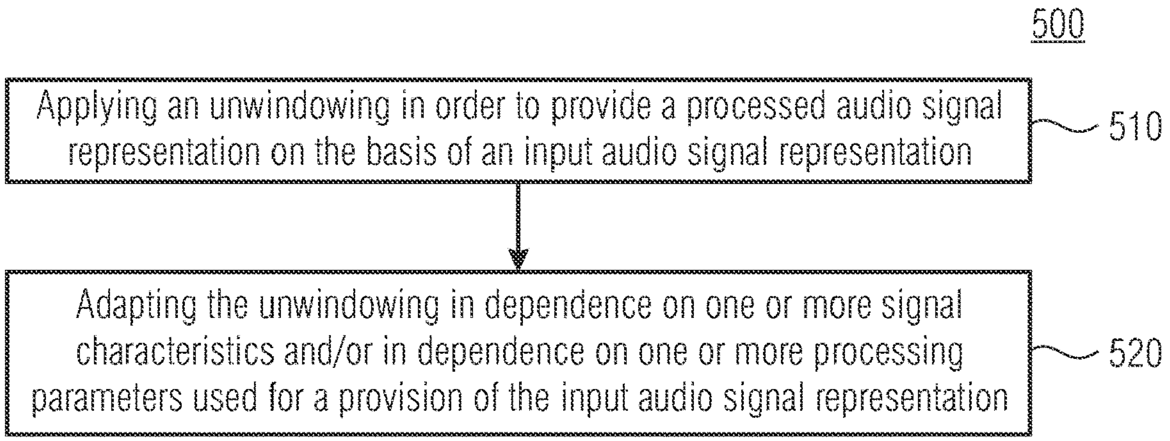
FIG. 5*a* shows a flow chart of a method for providing a processed audio signal representation according to an embodiment of the present invention.

FIG. 5*a* shows a flow chart of a method 500 for providing a processed audio signal representation on the basis of input audio signal representation $y_{[n]}$, which may be considered as the input audio signal of an apparatus as described herein. The method comprises applying 510 an un-windowing, e.g. an adaptive un-windowing, in order to provide the processed audio signal representation, e.g. $y_r[n]$, on the basis of the input audio signal representation. The un-windowing, for example, at least partially reverses an analysis windowing used for a provision of the input audio signal representation and is, e.g., defined by $f(y[n],w_a[n])$. The method 500 comprises adapting 520 the un-windowing in dependence on one or more signal characteristics and/or in dependence on one or more processing parameters used for a provision of the input audio signal representation. The one or more signal characteristics are, e.g., signal characteristics of the input audio signal representation or of an intermediate representation from which the input audio signal representation is derived and can, e.g., comprise a DC component d.

Figure 5B:
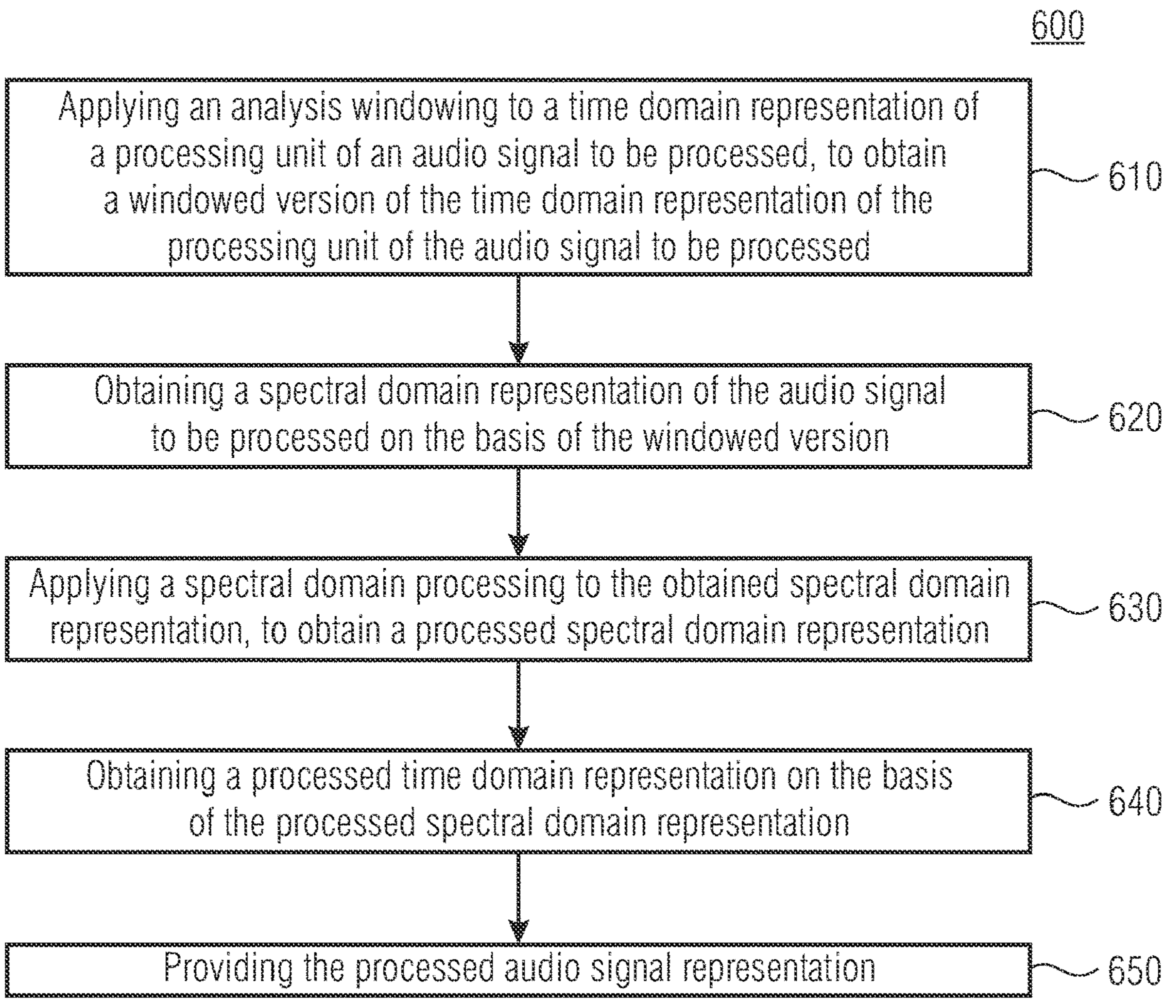
FIG. 5*b* shows a flow chart of a method for providing a processed audio signal representation on the basis of an audio signal to be processed according to an embodiment of the present invention.

FIG. 5*b* shows a flow chart of a method 600 for providing a processed audio signal representation on the basis of an audio signal to be processed, comprising applying 610 an analysis windowing to a time domain representation of a processing unit, e.g. a frame, of an audio signal to be processed, to obtain a windowed version of the time domain representation of the processing unit of the audio signal to be processed. Furthermore the method 600 comprises obtaining 620 a spectral domain representation, e.g. a frequency domain representation, of the audio signal to be processed on the basis of the windowed version, e.g. using a forward frequency transform, like, for example, a DFT. The method comprises applying 630 a spectral domain processing, e.g. a processing in the frequency domain, to the obtained spectral domain representation, to obtain a processed spectral domain representation. Additionally the method comprises obtaining 640 a processed time domain representation on the basis of the processed spectral domain representation, e.g. using an inverse time frequency transform, and providing 650 the processed audio signal representation using the method 500, wherein the processed time domain representation is used as the input audio signal for performing the method 500.

Figure 5C:
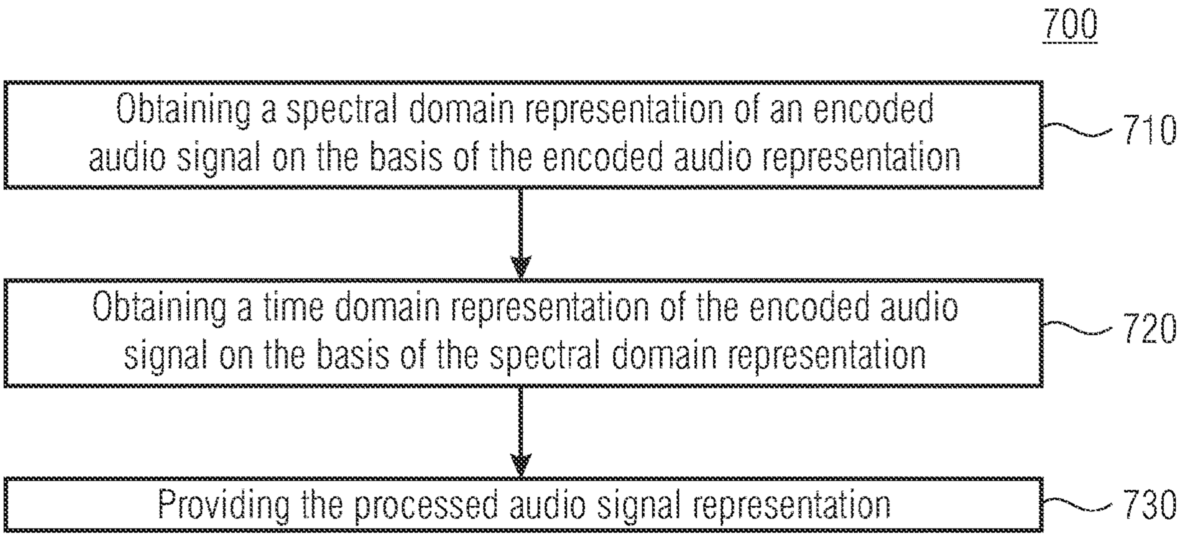
FIG. 5*c* shows a flow chart of a method for providing a decoded audio representation according to an embodiment of the present invention.

FIG. 5*c* shows a flow chart of a method 700 for providing a decoded audio representation on the basis of an encoded audio representation comprising obtaining 710 a spectral domain representation, e.g. a frequency domain representation, of an encoded audio signal on the basis of the encoded audio representation. Furthermore the method comprises obtaining 720 a time domain representation of the encoded audio signal on the basis of the spectral domain representation and providing 730 the processed audio signal representation using the method 500, wherein the time domain representation is used as the input audio signal for performing the method 500.

Figure 5D:
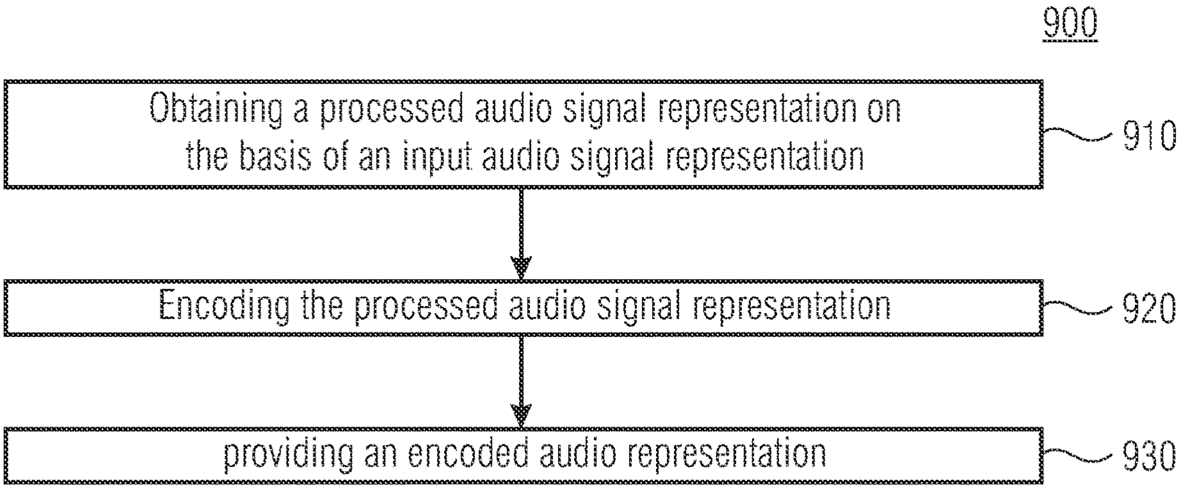
FIG. 5*d* shows a flow chart of a method for providing an encoded audio representation on the basis of an input audio signal representation.
Figure 6:
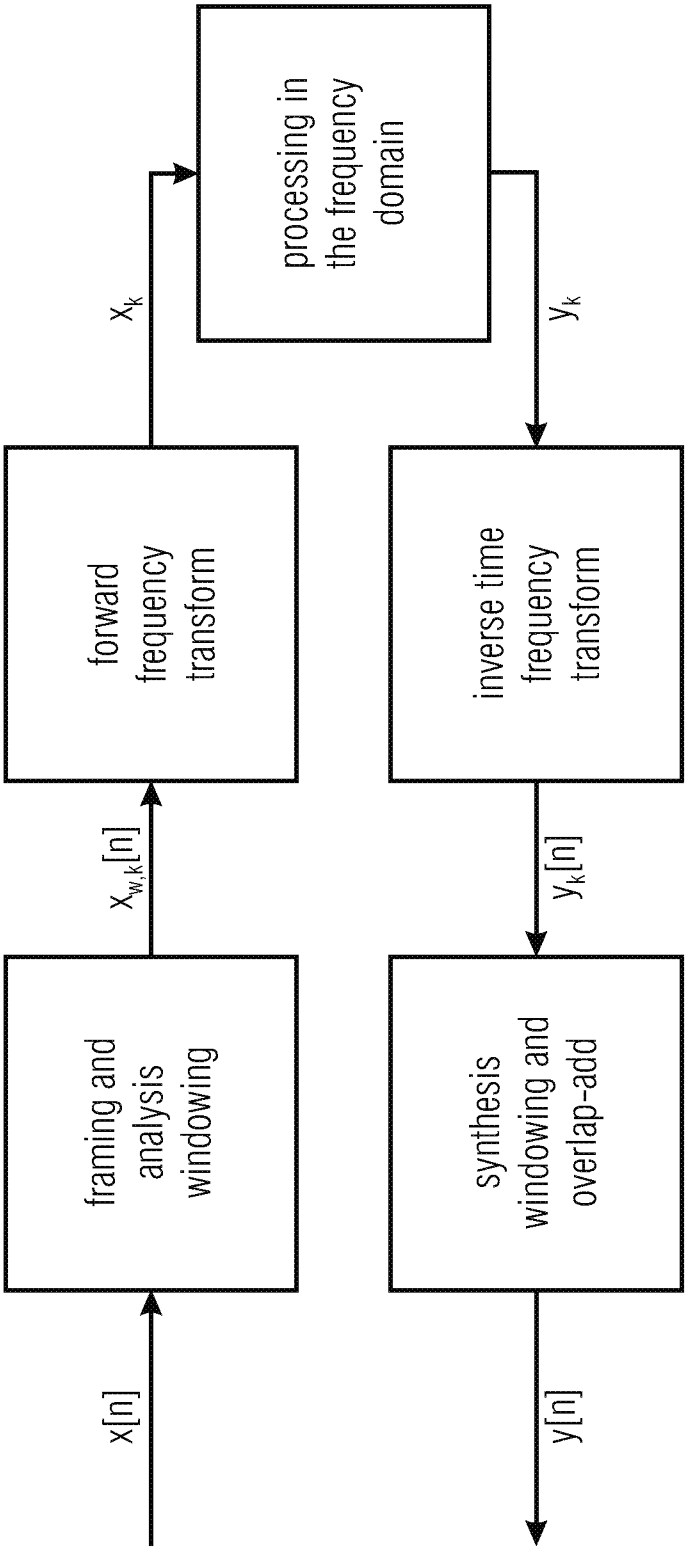
Fig. 6 (PRIOR ART)
FIG. 6 shows a flow chart of a common processing of an audio signal.
Figure 7:
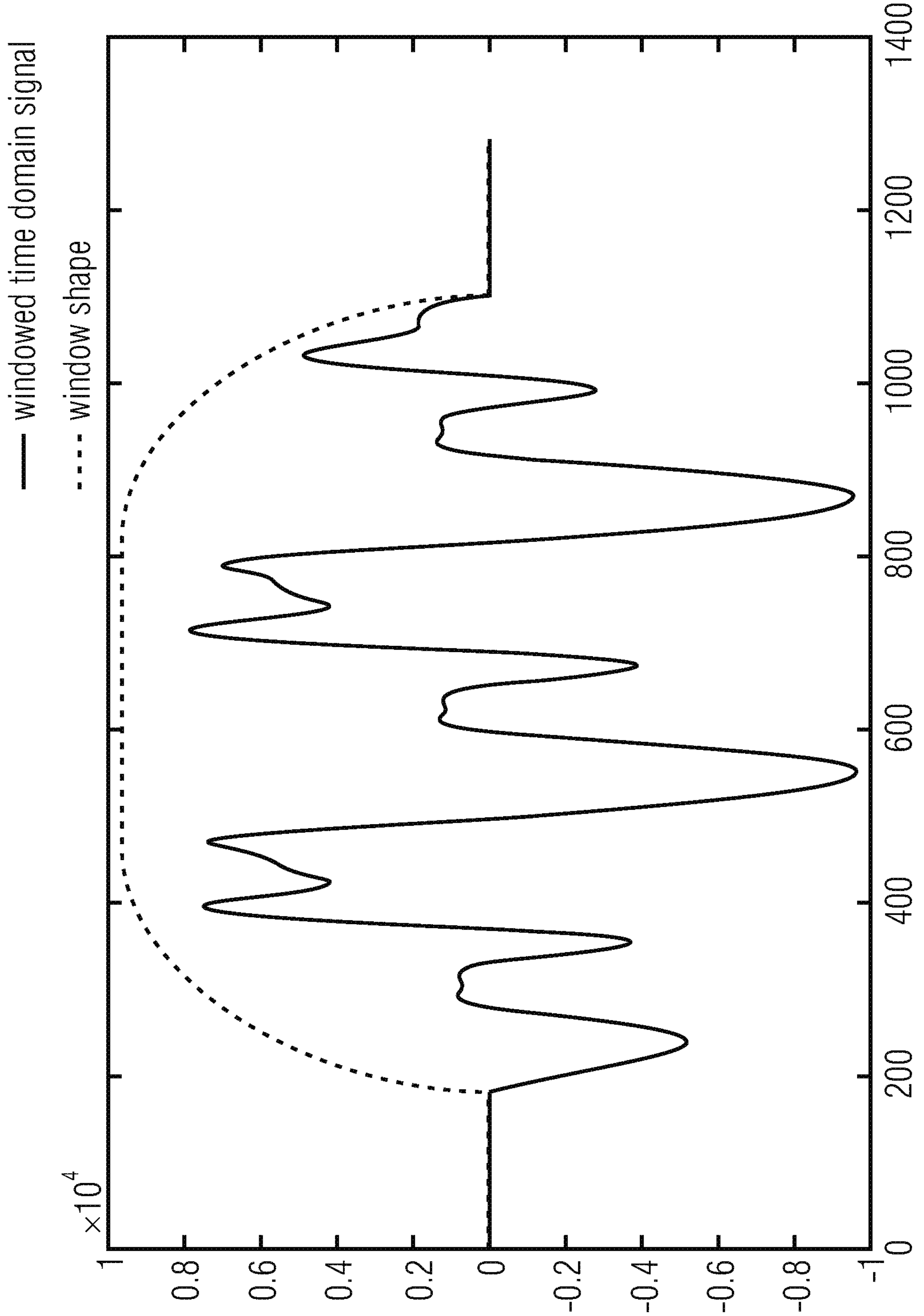
Fig. 7 (PRIOR ART)
FIG. 7 shows an example for a windowed frame of a time domain signal before the forward DFT and the corresponding applied window shape.

FIG. 5*d* shows a flow chart of a method 900 for providing 930 an encoded audio representation on the basis of an input audio signal representation. The method comprises obtaining 910 a processed audio signal representation on the basis of the input audio signal representation using the method 500. The method 900 comprises encoding 920 the processed audio signal representation.

Implementation Alternatives:

Although some aspects are described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for providing a processed speech/music audio signal representation on the basis of input audio signal representation, wherein the apparatus is configured to apply an un-windowing, in order to provide the processed audio signal representation on the basis of the input audio signal representation, wherein the apparatus is configured to adapt the un-windowing in dependence on one or more signal characteristics and/or in dependence on one or more processing parameters used for a provision of the input audio signal representation; and wherein the un-windowing at least partially reverses an analysis windowing used for a provision of the input audio signal representation;

wherein the un-windowing is configured to provide a given processing unit of the processed audio signal representation before a subsequent processing unit, which at least partially temporally overlaps the given processing unit, is available, wherein the apparatus is configured to adapt the un-windowing in dependence on a DC component of the input audio signal representation, and wherein the apparatus for providing the processed audio signal representation on the basis of the input audio signal representation is implemented using a hardware apparatus, or using a computer, or using a combination of a hardware apparatus and a computer.

2. The apparatus according to claim 1, wherein the apparatus is configured to adapt the un-windowing in dependence on processing parameters determining a processing used to derive the input audio signal representation.

3. The apparatus according to claim 1, wherein the apparatus is configured to adapt the un-windowing in dependence on signal characteristics of the input audio signal representation and/or of an intermediate signal representation from which the input audio signal representation is derived.

4. The apparatus according to claim 3, wherein the apparatus is configured to acquire one or more parameters describing signal characteristics of a time domain representation of a signal, to which the un-windowing is applied; and/or wherein the apparatus is configured to acquire one or more parameters describing signal characteristics of a frequency domain representation of an intermediate signal, from which a time domain input audio signal, to which the un-windowing is applied, is derived; and wherein the apparatus is configured to adapt the un-windowing in dependence on the one or more parameters.

5. The apparatus according to claim 1, wherein the apparatus is configured to adapt the un-windowing to at least partially compensate for a lack of signal values of a subsequent processing unit.

6. The apparatus according to claim 1, wherein the apparatus is configured to adapt the un-windowing to limit values of the processed audio signal representation.

7. The apparatus according to claim 1, wherein the apparatus is configured to adapt the un-windowing such that for an input audio signal representation which does not converge to zero in an end portion of a processing unit of the input audio signal, a scaling which is applied by the un-windowing in the end portion of the processing unit is reduced when compared to a case in which the input audio signal representation converges to zero in the end portion of the processing unit.

8. The apparatus according to claim 1, wherein the apparatus is configured to adapt the un-windowing, to thereby limit a dynamic range of the processed audio signal representation.

9. The apparatus according to claim 1, wherein the apparatus is configured to at least partially remove a DC component of the input audio signal representation.

10. The apparatus according to claim 1, wherein the un-windowing is configured to scale a DC-removed or DC-reduced version of the input audio signal representation in dependence on a window value in order to acquire the processed audio signal representation.

11. The apparatus according to claim 1, wherein the un-windowing is configured to at least partially re-introduce a DC component after a scaling of a DC-removed or DC-reduced version of the input audio signal.

12. The apparatus according to claim 1, wherein the un-windowing is configured to determine the processed audio signal representation $y_r[n]$ on the basis of the input audio signal representation y[n] according to $$y_r[n] = \frac{(y[n]-d)}{w_a[n]} + d,\ n \in [n_s; n_e]$$

wherein d is a DC component;

wherein n is a time index;

wherein $n_s$ is a time index of a first sample of an overlap region;

wherein $n_e$ is a time index of a last sample of the overlap region; and wherein $w_a[n]$ is an analysis window used for a provision of the input audio signal representation.

13. The apparatus according to claim 1, wherein the apparatus is configured to determine the DC component using one or more values of the input audio signal representation which lie in a time portion in which an analysis window used in a provision of the input audio signal representation comprises one or more zero values.

14. The apparatus according to claim 1, wherein the apparatus is configured to acquire the input audio signal representation using a spectral domain-to-time domain conversion.

15. An audio signal processor for providing a processed audio signal representation on the basis of an audio signal to be processed, wherein the audio signal processor is configured to apply an analysis windowing to a time domain representation of a processing unit of an audio signal to be processed, to acquire a windowed version of the time domain representation of the processing unit of the audio signal to be processed, and wherein the audio signal processor is configured to acquire a spectral domain representation of the audio signal to be processed on the basis of the windowed version, wherein the audio signal processor is configured to apply a spectral domain processing to the acquired spectral domain representation, to acquire a processed spectral domain representation, wherein the audio signal processor is configured to acquire a processed time domain representation on the basis of the processed spectral domain representation, and wherein the audio signal processor comprises an apparatus according to claim 1, wherein the apparatus is configured to acquire the processed time domain representation as its input audio signal representation, and to provide, on the basis thereof, the processed audio signal representation.

16. The audio signal processor according to claim 15, wherein the apparatus is configured to adapt the un-windowing using window values of the analysis windowing.

17. An audio decoder for providing a decoded audio representation on the basis of an encoded audio representation, wherein the audio decoder is configured to acquire a spectral domain representation of an encoded audio signal on the basis of the encoded audio representation, wherein the audio decoder is configured to acquire a time domain representation of the encoded audio signal on the basis of the spectral domain representation, and wherein the audio decoder comprises an apparatus according to claim 1, wherein the apparatus is configured to acquire the time domain representation as its input audio signal representation, and to provide, on the basis thereof, the processed audio signal representation.

18. The audio decoder according to claim 17, wherein the audio decoder is configured to provide the audio signal representation of a given processing unit before a subsequent processing unit which temporally overlaps with the given processing unit is decoded.

19. An audio encoder for providing an encoded audio representation on the basis of an input audio signal representation, wherein the audio encoder comprises an apparatus according to claim 1, wherein the apparatus is configured to acquire a processed audio signal representation on the basis of the input audio signal representation, and wherein the audio encoder is configured to encode the processed audio signal representation.

20. The audio encoder according to claim 19, wherein the audio encoder is configured to acquire a spectral domain representation on the basis of the processed audio signal representation, wherein the processed audio signal representation is a time domain representation, and wherein the audio encoder is configured to use a spectral-domain encoding to encode the spectral domain representation, to acquire the encoded audio representation.

21. The audio encoder according to claim 19, wherein the audio encoder is configured to encode the processed audio signal representation using a time-domain encoding to acquire the encoded audio representation.

22. The audio encoder according to claim 19, wherein the audio encoder is configured to encode the processed audio signal representation using a switching encoding which switches between a spectral-domain encoding and a time-domain encoding.

23. The audio encoder according to claim 19, wherein the apparatus is configured to perform a downmix of a plurality of input audio signals, which form the input audio signal representation, in a spectral domain, and to provide a downmixed signal as the processed audio signal representation.

24. The apparatus according to claim 1, wherein the un-windowing comprises dividing an end portion of a current processing unit of the input audio signal representation by an analysis window used for the provision of the input audio signal representation.

25. A method for providing a processed speech/music audio signal representation on the basis of input audio signal representation, wherein the method comprises applying an un-windowing, in order to provide the processed audio signal representation on the basis of the input audio signal representation, wherein the method comprises adapting the un-windowing in dependence on one or more signal characteristics and/or in dependence on one or more processing parameters used for a provision of the input audio signal representation, wherein the un-windowing at least partially reverses an analysis windowing used for a provision of the input audio signal representation;

wherein the un-windowing provides a given processing unit of the processed audio signal representation before a subsequent processing unit, which at least partially temporally overlaps the given processing unit, is available;

wherein the method comprises adapting the un-windowing in dependence on a DC component of the input audio signal representation; and wherein the method is performed using a hardware apparatus, or using a computer, or using a combination of a hardware apparatus and a computer.

26. A method for providing a processed audio signal representation on the basis of an audio signal to be processed, wherein the method comprises applying an analysis windowing to a time domain representation of a processing unit of an audio signal to be processed, to acquire a windowed version of the time domain representation of the processing unit of the audio signal to be processed, and wherein the method comprises acquiring a spectral domain representation of the audio signal to be processed on the basis of the windowed version, wherein the method comprises applying a spectral domain processing to the acquired spectral domain representation, to acquire a processed spectral domain representation, wherein the method comprises acquiring a processed time domain representation on the basis of the processed spectral domain representation, and wherein the method comprises providing the processed audio signal representation using the method according to claim 25, wherein the processed time domain representation is used as the input audio signal for performing the method according to claim 25.

27. A non-transitory digital storage medium having a computer program stored thereon to perform the method for providing a processed audio signal representation on the basis of an input audio signal to be processed according to claim 26, when said computer program is run by a computer.

28. A method for providing a decoded audio representation on the basis of an encoded audio representation, wherein the method comprises acquiring a spectral domain representation of an encoded audio signal on the basis of the encoded audio representation, wherein the method comprises acquiring a time domain representation of the encoded audio signal on the basis of the spectral domain representation, and wherein the method comprises providing the processed audio signal representation using the method according to claim 25, wherein the time domain representation is used as the input audio signal for performing the method according to claim 25.

29. A non-transitory digital storage medium having a computer program stored thereon to perform the method for providing a decoded audio representation on the basis of an encoded audio representation according to claim 28, when said computer program is run by a computer.

30. A method for providing an encoded audio representation on the basis of an input audio signal representation, wherein the method comprises acquiring a processed audio signal representation on the basis of the input audio signal representation using the method according to claim 25, and wherein the method comprises encoding the processed audio signal representation.

31. A non-transitory digital storage medium having a computer program stored thereon to perform the method for providing an encoded audio representation on the basis of an input audio signal representation according to claim 30, when said computer program is run by a computer.

32. A non-transitory digital storage medium having a computer program stored thereon to perform the method for providing a processed audio signal representation on the basis of an input audio signal representation according to claim 25, when said computer program is run by a computer.

33. An apparatus for providing a processed speech/music audio signal representation on the basis of input audio signal representation, wherein the apparatus is configured to apply an un-windowing, in order to provide the processed audio signal representation on the basis of the input audio signal representation, wherein the apparatus is configured to adapt the un-windowing in dependence on one or more signal characteristics and/or in dependence on one or more processing parameters used for a provision of the input audio signal representation; and wherein the apparatus is configured to adapt the un-windowing such that for an input audio signal representation which does not converge to zero in an end portion of a processing unit of the input audio signal, a scaling which is applied by the un-windowing in the end portion of the processing unit is reduced when compared to a case in which the input audio signal representation converges to zero in the end portion of the processing unit, and wherein the un-windowing at least partially reverses an analysis windowing used for a provision of the input audio signal representation, and wherein the apparatus for providing the processed audio signal representation on the basis of the input audio signal representation is implemented using a hardware apparatus, or using a computer, or using a combination of a hardware apparatus and a computer.

34. The apparatus according to claim 33, wherein the un-windowing comprises dividing an end portion of a current processing unit of the input audio signal representation by an analysis window used for the provision of the input audio signal representation.

35. A method for providing a processed speech/music audio signal representation on the basis of input audio signal representation, wherein the method comprises applying an un-windowing, in order to provide the processed audio signal representation on the basis of the input audio signal representation, wherein the method comprises adapting the un-windowing in dependence on one or more signal characteristics and/or in dependence on one or more processing parameters used for a provision of the input audio signal representation, wherein the adapting of the un-windowing is performed such that for an input audio signal representation which does not converge to zero in an end portion of a processing unit of the input audio signal, a scaling which is applied by the un-windowing in the end portion of the processing unit is reduced when compared to a case in which the input audio signal representation converges to zero in the end portion of the processing unit, and wherein the un-windowing at least partially reverses an analysis windowing used for a provision of the input audio signal representation, wherein the method is performed using a hardware apparatus, or using a computer, or using a combination of a hardware apparatus and a computer.

36. A non-transitory digital storage medium having a computer program stored thereon to perform the method for providing a processed audio signal representation on the basis of an input audio signal representation according to claim 35, when said computer program is run by a computer.

37. An apparatus for providing a processed speech/music audio signal representation on the basis of input audio signal representation, wherein the apparatus is configured to apply an un-windowing, in order to provide the processed audio signal representation on the basis of the input audio signal representation, wherein the apparatus is configured to adapt the un-windowing in dependence on one or more signal characteristics and/or in dependence on one or more processing parameters used for a provision of the input audio signal representation; and wherein the un-windowing at least partially reverses an analysis windowing used for a provision of the input audio signal representation;

wherein the un-windowing is configured to provide a given processing unit of the processed audio signal representation before a subsequent processing unit, which at least partially temporally overlaps the given processing unit, is available, wherein the un-windowing is configured to at least partially re-introduce a DC component after a scaling of a DC-removed or DC-reduced version of the input audio signal, and wherein the apparatus for providing the processed audio signal representation on the basis of the input audio signal representation is implemented using a hardware apparatus, or using a computer, or using a combination of a hardware apparatus and a computer.

38. A method for providing a processed speech/music audio signal representation on the basis of input audio signal representation, wherein the method comprises applying an un-windowing, in order to provide the processed audio signal representation on the basis of the input audio signal representation, wherein the method comprises adapting the un-windowing in dependence on one or more signal characteristics and/or in dependence on one or more processing parameters used for a provision of the input audio signal representation, wherein the un-windowing at least partially reverses an analysis windowing used for a provision of the input audio signal representation; and wherein the un-windowing provides a given processing unit of the processed audio signal representation before a subsequent processing unit, which at least partially temporally overlaps the given processing unit, is available; and wherein the un-windowing at least partially re-introduces a DC component after a scaling of a DC-removed or DC-reduced version of the input audio signal, wherein the method is performed using a hardware apparatus, or using a computer, or using a combination of a hardware apparatus and a computer.

39. A non-transitory digital storage medium having a computer program stored thereon to perform the method for providing a processed audio signal representation on the basis of an input audio signal representation according to claim 38, when said computer program is run by a computer.

40. An apparatus for providing a speech/music processed audio signal representation on the basis of input audio signal representation, wherein the apparatus is configured to apply an un-windowing, in order to provide the processed audio signal representation on the basis of the input audio signal representation, wherein the apparatus is configured to adapt the un-windowing in dependence on one or more signal characteristics and/or in dependence on one or more processing parameters used for a provision of the input audio signal representation; and wherein the un-windowing at least partially reverses an analysis windowing used for a provision of the input audio signal representation;

wherein the un-windowing is configured to provide a given processing unit of the processed audio signal representation before a subsequent processing unit, which at least partially temporally overlaps the given processing unit, is available, wherein the un-windowing is configured to determine the processed audio signal representation $y_r[n]$ on the basis of the input audio signal representation y[n] according to $$y_r[n] = \frac{(y[n] - d)}{w_a[n]} + d,\ n \in [n_s; n_e]$$

wherein d is a DC component;

wherein n is a time index;

wherein $n_s$ is a time index of a first sample of an overlap region;

wherein $n_e$ is a time index of a last sample of the overlap region; and wherein $w_a[n]$ is an analysis window used for a provision of the input audio signal representation, and wherein the apparatus for providing the processed audio signal representation on the basis of the input audio signal representation is implemented using a hardware apparatus, or using a computer, or using a combination of a hardware apparatus and a computer.

41. A method for providing a processed speech/music audio signal representation on the basis of input audio signal representation, wherein the method comprises applying an un-windowing, in order to provide the processed audio signal representation on the basis of the input audio signal representation, wherein the method comprises adapting the un-windowing in dependence on one or more signal characteristics and/or in dependence on one or more processing parameters used for a provision of the input audio signal representation, wherein the un-windowing at least partially reverses an analysis windowing used for a provision of the input audio signal representation; and wherein the un-windowing provides a given processing unit of the processed audio signal representation before a subsequent processing unit, which at least partially temporally overlaps the given processing unit, is available; and wherein the un-windowing determines the processed audio signal representation $y_r[n]$ on the basis of the input audio signal representation y[n] according to $$y_r[n] = \frac{(y[n] - d)}{w_a[n]} + d,\ n \in [n_s; n_e]$$

wherein d is a DC component;

wherein n is a time index;

wherein $n_s$ is a time index of a first sample of an overlap region;

wherein $n_e$ is a time index of a last sample of the overlap region; and wherein $w_a[n]$ is an analysis window used for a provision of the input audio signal representation, wherein the method is performed using a hardware apparatus, or using a computer, or using a combination of a hardware apparatus and a computer.

42. A non-transitory digital storage medium having a computer program stored thereon to perform the method for providing a processed audio signal representation on the basis of an input audio signal representation according to claim 41, when said computer program is run by a computer.

* * * * *